US011315396B2

(12) United States Patent
Kaindl

(10) Patent No.: US 11,315,396 B2
(45) Date of Patent: Apr. 26, 2022

(54) THREAT IDENTIFICATION DEVICE AND SYSTEM WITH OPTIONAL ACTIVE COUNTERMEASURES

(71) Applicant: Robert Kaindl, Redmond, WA (US)

(72) Inventor: Robert Kaindl, Redmond, WA (US)

( * ) Notice: Subject to any disclaimer, the term of this patent is extended or adjusted under 35 U.S.C. 154(b) by 0 days.

(21) Appl. No.: 16/957,362

(22) PCT Filed: Jan. 8, 2019

(86) PCT No.: PCT/US2019/012741
§ 371 (c)(1),
(2) Date: Jun. 23, 2020

(87) PCT Pub. No.: WO2019/136463
PCT Pub. Date: Jul. 11, 2019

(65) Prior Publication Data
US 2020/0334961 A1  Oct. 22, 2020

Related U.S. Application Data

(60) Provisional application No. 62/614,796, filed on Jan. 8, 2018.

(51) Int. Cl.
*G08B 5/00* (2006.01)
*B60Q 1/24* (2006.01)
(Continued)

(52) U.S. Cl.
CPC .............. *G08B 5/002* (2013.01); *B60Q 1/24* (2013.01); *F41H 11/00* (2013.01); *G01S 13/886* (2013.01)

(58) Field of Classification Search
None
See application file for complete search history.

(56) References Cited

U.S. PATENT DOCUMENTS 5,370,566 A  12/1994  Mitchell, Jr. et al.
5,690,411 A  11/1997  Jackman
(Continued)

FOREIGN PATENT DOCUMENTS

CN  103164926 A  6/2013
ES  2 416 579 A1  8/2013

OTHER PUBLICATIONS

International Search Report and Written Opinion for PCT/US2019/012741, dated Mar. 29, 2019, 9 pages.
(Continued)

*Primary Examiner* — Fekadeselassie Girma
(74) *Attorney, Agent, or Firm* — Seed Intellectual Property Law Group LLP

(57) ABSTRACT

Threat identification devices, systems, and methods are disclosed which identify and locate various threats and provide a variety of countermeasures to reduce the loss of life in an attack. In one implementation, a device is provided with a housing and a plurality of tubes coupled to and extending from the housing. Sensors are located within the tubes for sensing external conditions. A control unit is in electronic communication with the sensors. Upon detection of an external condition, the sensors transmit a signal to the control unit, which activates countermeasures, including rotating light sources to identify the location of the external condition as well as preferred escape routes. The control unit may also transmit signals to other devices in the environment, including video panels and speakers, to provide instructions.

25 Claims, 14 Drawing Sheets

(51) Int. Cl.
   *F41H 11/00* (2006.01)
   *G01S 13/88* (2006.01)

(56) References Cited

U.S. PATENT DOCUMENTS

| | | | |
|---|---|---|---|
| 6,756,901 B2 | 6/2004 | Campman | |
| 8,610,559 B2 | 12/2013 | Cai et al. | |
| 9,013,290 B2 | 4/2015 | Rigaud et al. | |
| 9,168,862 B2 | 10/2015 | Yang | |
| 11,049,380 B2 | 6/2021 | Kaindl | |
| 2002/0044052 A1 | 4/2002 | Stewart | |
| 2003/0213045 A1 | 11/2003 | Fuentes | |
| 2004/0012491 A1 | 1/2004 | Kulesz et al. | |
| 2005/0113167 A1 | 5/2005 | Buchner et al. | |
| 2005/0207138 A1 | 9/2005 | Cheung | |
| 2009/0131165 A1 | 5/2009 | Buchner et al. | |
| 2010/0194575 A1* | 8/2010 | Rodriguez | G08B 17/10 340/628 |
| 2010/0253501 A1 | 10/2010 | Gibson | |
| 2011/0130636 A1 | 6/2011 | Daniel et al. | |
| 2012/0005108 A1* | 1/2012 | Hollenshead | G06Q 30/02 705/306 |
| 2012/0185115 A1 | 7/2012 | Dean | |
| 2013/0063270 A1* | 3/2013 | Mahajan | G08B 21/14 340/632 |
| 2013/0240877 A1 | 9/2013 | Nishijima | |
| 2014/0070606 A1* | 3/2014 | Gibeau | B60L 58/15 307/9.1 |
| 2014/0135644 A1 | 5/2014 | Kim | |
| 2014/0017296 A1 | 6/2014 | Morgan | |
| 2014/0298890 A1* | 10/2014 | Pruett | G01N 33/0004 73/31.02 |
| 2014/0368814 A1* | 12/2014 | Krupkin | G01S 7/4804 356/139.08 |
| 2014/0370817 A1 | 12/2014 | Luna | |
| 2015/0035437 A1* | 2/2015 | Panopoulos | B60L 53/12 315/112 |
| 2015/0143601 A1 | 5/2015 | Longinotti-Buitoni et al. | |
| 2015/0185045 A1 | 7/2015 | Crawford et al. | |
| 2015/0223731 A1 | 8/2015 | Sahin | |
| 2015/0366275 A1 | 12/2015 | Cserfoi | |
| 2016/0068214 A1 | 3/2016 | Tang et al. | |
| 2016/0313795 A1* | 10/2016 | Muramatsu | H01L 41/0986 |
| 2016/0370863 A1 | 12/2016 | Jones et al. | |
| 2017/0151989 A1 | 6/2017 | Daniels | |
| 2017/0178471 A1 | 6/2017 | Levesque et al. | |
| 2017/0202275 A1 | 7/2017 | St. John | |
| 2017/0225321 A1* | 8/2017 | Deyle | B25J 9/1679 |
| 2018/0111625 A1* | 4/2018 | James | B60W 30/18009 |
| 2018/0158255 A1* | 6/2018 | Garcia | B60Q 1/52 |
| 2018/0370567 A1* | 12/2018 | Rowell | G06T 19/006 |
| 2019/0217681 A1* | 7/2019 | Lin | B60H 1/00521 |
| 2019/0285753 A1* | 9/2019 | Spruit | G01S 7/497 |
| 2021/0086370 A1* | 3/2021 | Zhang | G06F 3/011 |

OTHER PUBLICATIONS

Elliott et al., "Utilizing Glove-Based Gestures and a Tactile Vest Display for Covert Communications and Robot Control," *Army Research Laboratory*, Aberdeen Proving Ground, MD, ARL-TR-6971, Jun. 2014.

Erp et al., "Waypoint Navigation with a Vibrotactile Waist Belt," *ACM Transactions on Applied Perception* 2(20): 106-117, 2005.

Pettitt et al., "Comparison of Army Hand and Arm Signals to a Covert Tactile Communication System in a Dynamic Environment," *Army Research Laboratory*, Aberdeen Proving Ground, MD, ARL-TR-3838, Aug. 2006.

Extended European Search Report for EP 19735853.4, dated Sep. 23, 2021. (13 pages).

\* cited by examiner

THREAT IDENTIFICATION DEVICE AND SYSTEM WITH OPTIONAL ACTIVE COUNTERMEASURES

BACKGROUND

Technical Field

The present disclosure relates to threat identification systems, devices, and methods, and more particularly, to threat identification systems, devices, and methods employing a plurality of tubes and a plurality of sensors to detect and transmit threat information to a controller to initiate various active countermeasures.

Description of the Related Art

An unfortunate aspect of modern society is the capability of people to successfully carry out acts of terrorism wherein a single person can cause a significant loss of life. Such acts of terrorism are commonly directed to locations where groups of potential victims assemble en masse, such as an open air concert venue, a stadium, a train station, or a market, for example. In such situations, the perpetrator of the threat can use any number of devices to cause harm to others in rapid succession, such as blunt force trauma weapons, guns, or biological toxins, among others.

In response to these ever present threats, certain threat identification systems have been developed. For example, one known system is a central broadcast warning system, where a user can subscribe to receive alert updates, usually through a user's mobile phone or other wearable electronic device, from a central broadcast system in response to a reported threat, such as an active shooter in the area of the user. Other systems include broadcasting simple auditory or visual warnings, such as flashing lights and an auditory alarm in response to a fire alarm being activated. However, as demonstrated during a number of unfortunate recent events, such systems are inadequate at quickly identifying and locating threats and activating optional countermeasures to prevent the loss of life. In other words, current systems that provide an auditory or visual warning do not present information to prospective victims about the location of the threat or how to best respond in order to avoid the threat, such as safe escape routes that are away from the direction of the threat. Rather, such systems only tend to induce hysteria in a crowd, thus enabling a threat perpetrator, e.g., a terrorist, to continue carrying out an attack while increasing the chances at escape.

For example, one major disadvantage of such systems is the inability of the systems to locate the threat. In the example of an active shooter in an area, it can take hours for police and tactile response units to locate and eliminate the threat. Meanwhile, the active shooter remains at-large, with victims at significant risk of serious bodily injury or death. While certain solutions to this issue have been proposed, many such solutions are fallible because they include vital electronic components which are easily disabled by a single gunshot, for example. Moreover, simply receiving an alert update about an active shooter in an area does not effectively assist law enforcement with locating the threat, nor does it effectively assist potential victims with safely escaping the threat. In other words, a further disadvantage of known systems is that such systems simply do not provide any countermeasures or otherwise assist victims in escaping the threat.

In other situations, such as when an airborne pathogen or toxin is released, it can take days or even weeks to detect the release of the pathogen, as detection usually only occurs once victims begin to show symptoms. In general, current threat detection systems are inadequate at identifying these types of threats, much less providing threat response measures. As such, current threat identification systems are inadequate at identifying and locating a variety of threats and providing countermeasures to prevent the loss of human life in an attack.

BRIEF SUMMARY

Implementations of the present disclosure include threat identification devices, systems, and methods which detect and identify a threat, including its location and range, and provide various countermeasures. In one exemplary implementation, a threat identification device includes: a housing; a plurality of tubes coupled to the housing and translatable between a first position and a second position; a first actuator coupled to the housing and to the plurality of tubes; a plurality of sensors, each sensor coupled to at least a corresponding one of the plurality of tubes; and a controller in electronic communication with the first actuator and the plurality of sensors, wherein during operation, the controller provides a first signal to the first actuator to translate the plurality of tubes between the first position and the second position and the controller receives a second signal from at least one of the plurality of sensors in response to an external condition detected by the at least one of the plurality of sensors.

The implementation may further include: a plurality of optic lasers coupled to the housing and in electronic communication with the controller, wherein when the controller receives the second signal, the controller outputs a third signal to activate the plurality of optic lasers in response to the external condition; a plurality of second actuators coupled to corresponding ones of the plurality of optic lasers, wherein the plurality of optic lasers are rotatable about two degrees of freedom and wherein when the controller receives the second signal, the controller outputs a fourth signal to the plurality of second actuators to rotate the plurality of optic lasers in a direction corresponding to the external condition; and a plurality of strobe lights coupled to the housing and in electronic communication with the controller, wherein when the controller receives the second signal, the controller outputs a third signal to activate the plurality of strobe lights in response to the external condition.

The implementation may further include: a plurality of second actuators coupled to corresponding ones of the plurality of strobe lights, wherein the plurality of strobe lights are rotatable about two degrees of freedom and wherein when the controller receives the second signal, the controller outputs a fourth signal to the plurality of second actuators to rotate the plurality of strobe lights in a direction corresponding to the external condition; a shield curtain located external to the housing and deployable from a third position to a fourth position, wherein the shield curtain is in electronic communication with the controller and wherein when the controller receives the second signal, the controller outputs a third signal to the shield curtain to deploy the shield curtain from the first position to the second position; a plurality of light sources located external to the housing and in electronic communication with the controller, wherein when the controller receives the second signal, the controller outputs a third signal to at least one of the plurality of light sources to activate the at least one of the plurality of light sources in response to the external condition; and wherein when the controller receives the second signal, the controller outputs a third signal corresponding to an alert to a personal electronic device.

An alternative exemplary implementation of a threat identification device includes: a base; a housing coupled to and extending from the base; a plurality of tubes coupled to and extending from the housing; a plurality of sensors, each sensor of the plurality of sensors coupled to a corresponding one of the plurality of tubes; and a controller in electronic communication with the plurality of sensors, wherein during operation, at least one of the plurality of sensors provides a first signal to the controller in response to an external condition detected by the at least one of the plurality of sensors, and the controller outputs a second signal based on the first signal, the second signal representing location information corresponding to a direction of the external condition.

The implementation may further include: a trailer, wherein the base is coupled to the trailer and wherein the base is moveable between a collapsed configuration and an extended configuration; a plurality of actuators coupled to corresponding ones of the plurality of tubes and in electronic communication with the controller, wherein the plurality of tubes are moveable between a first position and a second position, the second position corresponding to the extended configuration of the base; and a plurality of lasers rotatably coupled to the base and in electronic communication with the controller, wherein the controller outputs the second signal to a first one of the plurality of lasers to rotate the first one of the plurality of lasers in the direction of the external condition.

The implementation may further include: wherein the controller outputs the second signal to a second one of the plurality of lasers to rotate the second one of the plurality of lasers in a direction opposite to the direction of the external condition; a plurality of strobe lights rotatably coupled to the base and in electronic communication with the controller, wherein the controller outputs the second signal to at least one of the plurality of strobe lights to rotate the at least one of the plurality of strobe lights in the direction of the external condition; and a plurality of shield curtains in electronic communication with the controller, wherein the controller outputs the second signal to the plurality of shield curtains to deploy the plurality of shield curtains from a storage configuration to a deployed configuration.

An exemplary implementation of a method may include: detecting an external condition with at least one of a plurality of sensors coupled to a plurality of tubes extending from a housing coupled to a base, each of the plurality of sensors in electronic communication with a controller; transmitting a first signal corresponding to the external condition to the controller; processing the first signal with the controller, the processing including determining direction information corresponding to a direction of the external condition; and outputting a second signal from the controller corresponding to the direction information.

The method may further include: wherein outputting the second signal from the controller includes outputting the second signal to a plurality of lasers rotatably coupled to the base, at least one of the plurality of lasers rotating to the direction of the external condition based on the second signal; wherein outputting the second signal from the controller includes outputting the second signal to a plurality of strobe lights rotatably coupled to the base, at least one of the plurality of strobe lights rotating to the direction of the external condition based on the second signal; wherein outputting the second signal from the controller includes transmitting the second signal to a remote electronic device in electronic communication with the controller, the remote electronic device providing a warning indicator based on the second signal; and wherein outputting the second signal from the controller includes transmitting the second signal to a plurality of shield curtains in electronic communication with the controller to deploy the plurality of shield curtains from a first configuration to a second configuration.

BRIEF DESCRIPTION OF THE SEVERAL VIEWS OF THE DRAWINGS

For a better understanding of the implementations, reference will now be made by way of example only to the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be enlarged and positioned to improve drawing legibility. Further, the particular shapes of the elements as drawn are not necessarily intended to convey any information regarding the actual shape of the particular elements, and may have been selected solely for ease of recognition in the drawings.

DETAILED DESCRIPTION

Figure 1A:
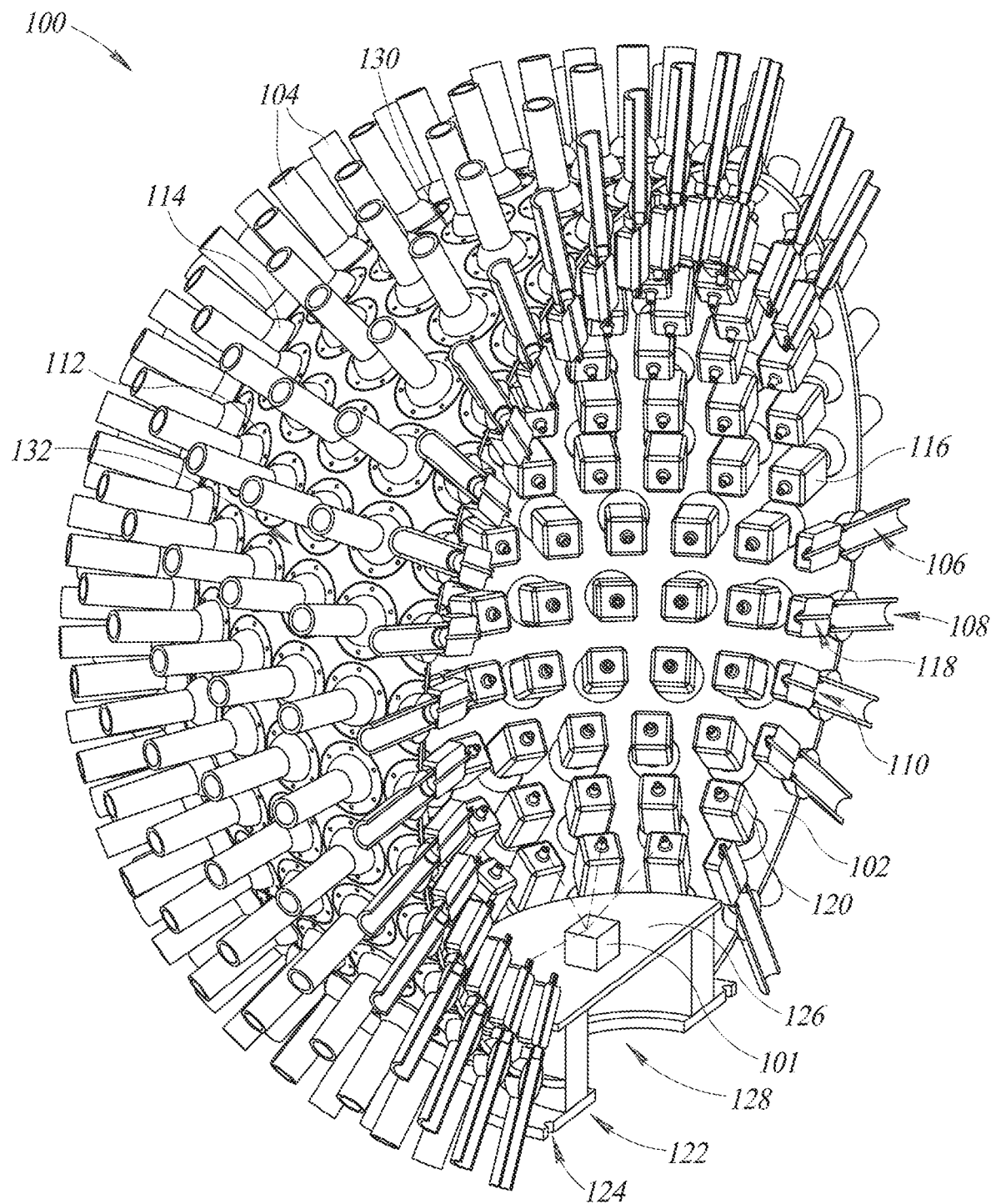
FIG. 1A is a perspective cut-away view of an exemplary implementation of a housing having a plurality of tubes extending from the housing.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with threat detection systems, devices, and methods have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The relative terms "approximately" and "substantially," when used to describe a value, amount, quantity, or dimension, generally refer to a value, amount, quantity, or dimension that is within plus or minus 3% of the stated value, amount, quantity, or dimension, unless the content clearly dictates otherwise. It is to be further understood that any specific dimensions of components provided herein are for illustrative purposes only with reference to the exemplary implementations described herein, and as such, the present disclosure includes amounts that are more or less than the dimensions stated, unless the context clearly dictates otherwise.

Implementations of the present disclosure include an active threat identification system, method and device that offers threat identification, defensive postures and efficiencies with responsive actions relating to an environment and more particularly, provide the ability to identify and respond to an immediate threat. In order to facilitate identification and response to certain threats, implementations of the present disclosure can include user-protection or situational awareness circuitry, integrated into providing threat-to-target-to-escape opportunities and information to probable victims in order to avoid personal physical injuries. The user-protection circuitry can include condition-detection circuitry and broadcast announcement circuitry, which, in operation, generates one or more countermeasure announcements or alert indications related to an environment. The user-protection circuitry provides at least one type of defensive solution by determining or identifying a possible situational response for people in groups, at a location, in an event or at a public gathering. The broadcast control-circuitry provides visual, sound, verbal, pulsing, silent, autonomous, wireless or covert announcements directly to the public and law enforcement officials in an effort to protect against physical threats.

In an implementation, systems, devices, and methods of the present disclosure activate broadcast circuitry based on one or more indications related to the environment, generated by the condition-detection circuitry, systems and sensors. This alert system provides a defensive posture opportunity or offensive response condition for targeted probable victims by identifying and announcing the direction and range of the posed threats. In one non-limiting example, a possible scenario may arise where spectators at an open-air concert are targeted by terrorists with fully automatic weapons. The responsive countermeasures may include multiple laser triangulations pointing to the terrorist providing information for spectators of which direction to escape to best avoid being targeted by the shooter, as described herein. In another non-limiting example, at a football game or any other outdoor or indoor event, announcements and broadcasts may be coordinated around the perimeter of a structure of the stadium or other building hosting the event, with lighted panels or speakers. In certain implementations, the system can quickly identify and pinpoint each source location of multiple threats, identify, and then broadcast the type of weapon used, including the caliber of the bullet used in the attack through shockwave assessment.

As such, implementations of the present disclosure can direct law enforcement to the identified threat source, such that law enforcement officials are not delayed by usual processes. For example, an implementation of the systems described herein utilizes a series of specific zone quadrants with overlapping efficiencies to confirm threat awareness and accurate location information corresponding to the threat. Moreover, implementations of the present disclosure are not limited to identifying active shooters, but rather, can detect and identify multiple other forms of threats. As a non-limiting example, implementations of the devices and systems described herein can identify the direction of the point of release of biological warfare, such as radiation or toxins, in the case of airborne bioterrorism in order to provide probable victims a reaction-to-exit survivability strategy.

Furthermore, identifying and announcing the location of a terrorist's gunshot or other threat, including, for example, lasers, shockwaves, covert sonic or compression sound wave devices (loss of hearing), bombs or fallout, etc., in near real-time helps to reduce personal injuries or death associated with such threats. In other words, in a situation where an active threat is introduced, the ensuing hysteria and inattentiveness among victims increases the risk of further harm to victims. Providing victims in such situations with near real-time information regarding an active threat enables situational awareness, knowledge and guidance of how to respond to, and survive, such a threat.

Terrorism risk assessment conditions are encouraging populations to adjust their behaviors and update motivations by creating newly learned behaviors in order to protect themselves. People currently have limited ways to signal their presence to others or limited ways to detect the presence or intended activities of others. Furthermore, probable victims have limited ways to identify exit strategies or safety posturing positioning awarenesses from perceived real-time active threats. Hostile risk tends to be overcome by the ability to identify an immediate physical threat. Global soft-target vulnerabilities, lone-wolf sympathizers, radical terrorist threat hysteria or simple unavoidable inattentiveness pose inordinately severe impacts on victims' lives. Personal safety, injury avoidance or other opportunities for proactive defensive measures should be in the forefront of probable victims' minds. Risk management opportunities in populations and within governments are predictable and tend to be reactive rather than proactive. The systems, devices, and methods described herein identify and target a threat or series of threats and then identify and announce the location, position and range of the threat in near real-time. Providing an announcement in near-real time allows time for a responsive defensive action or introduces additional time for a safe exit opportunity for all potential victims.

Implementations of the present disclosure can track multiple predetermined reactive threat responsibilities by splitting general areas into separate multiples of specific smaller zones. The implementations surveil specific small targeted zones while being independently surveilled simultaneously around the device through several zone tubes searching for additional threats. As such, certain implementations are capable of tracking, identifying and broadcasting several separate threat cues simultaneously or concurrently. Utilizing and adding more threat identification devices to a threat identification system according to the present disclosure can benefit more surveillance zone overlap by increasing broad redundancies throughout coverage areas, thus resulting in further narrowing of a target's conditions. Tube zone sensors test readings through multiple individual hollow directionally pointed outward protruding tubes. Those protuberant pipes are usually mounted perpendicular or irregularly angled while affixed onto a housing in random or consistent positions and directions. For example, one zone tube can be responsible for sensing the conditions within one specific radial area away from the housing generally in the direction of the tube.

In other implementations, the systems and devices described herein utilize interchangeable sensors or threat sensors depending on the information or threat desired to be sensed. Identifying a shooter's location, sensing the timing or direction of a chemical invasion to providing possible victims a lifesaving condition and how to respond to a threat to an offensive directed countermeasures function are well within the scope of such implementations, but these are only a few non-limiting examples. These capabilities provide flexibilities regarding the desired actionable responses output by the systems and devices as explained below. For example, threat specific sensors or multiple sensors for detecting different types of threats can be installed and activated within a single housing or multiple housings to form a system or a series of systems in electronic communication with each other. As such, implementations of the present disclosure are capable of identifying a threat or a series of threats then announcing the proposed condition, thus allowing a responsive announcement or calculated defensive opportunity.

The distinct and high strength structural design of the implementations described herein assert an aggressive defensive presence that can in and of itself be a threat deterrent. In some implementations, the visual appearance of the threat identification device or system may not change between when the system is activated and deactivated so as further create confusion for terrorists, or for those planning an attack. For example, not knowing or seeing the system's actual "on or off" status from outside visual cues might slow down a shooter. Identifying active threats while broadcasting the threat's direction, location and range will further minimize the opportunities by the threat perpetrator, for example, a shooter, to continue attacking, while allowing the victims time to escape safely.

Moreover, some implementations of the present disclosure are capable of monitoring and protecting populations with an early warning system from airborne pathogens by providing early indications of a biological attack. In other words, identifying or anticipating future threat conditions at the point of release of biological warfare threats by airborne bioterrorism are within the scope of the present disclosure. Intentionally releasing chemicals in a vapor or aerosolized form in public transportation areas or other populated settings usually creates greater and complete exposure, thus complicating aversion of the threat. As described above, if such threats are not identified quickly, then depending upon the agent (including, without limitation, radioactive material), a biological attack may go undetected for hours, days, or weeks until the victims begin to show symptoms of the exposure. Certain aspects of the implementations of the disclosure include an internal low-pressure vacuum system that creates a pressure differential within a housing to expedite launching vaporous threat countermeasures. Further, the scope of the present disclosure includes, but is not limited to, detecting various biological threats, such as dissemination of a virus, bacteria or biological toxin through appropriate sensors.

When a weapon has been fired, detection capabilities of implementations of the present disclosure can identify threat signatures through radar for muzzle blasts or flashes, pressure and shock waves, infrared and thermal signatures of a bullet, missile or projectiles, for example. As used herein, unless the context clearly dictates otherwise, "radar" refers to a system that uses radio waves in any number of available frequencies and wavelengths to determine the range, angle, or velocity of objects, including a transmitter for producing electromagnetic waves in the radio or microwave wavelength domains, as well as a transmitting antenna, a receiving antenna, and a receiver and a processor for determining properties of the objects. Radio waves, which may be either pulsed or continuous, for example, from the transmitter reflect off the object and return to the receiver, giving information about the object's location and speed. In certain implementations, an electronic amplifier can be used to increase the signal strength of the reflected electromagnetic signals.

In other aspects, electromagnetic waves may measure the reflective supersonic or subsonic shock wave sources. Then, upon measuring the supersonic or subsonic shock waves, the implementations may transmit a signal to various electronic components of the implementations, including illumination devices or speakers for example, for identifying, targeting, broadcasting and then neutralizing the threat. Identifying the direction and range of terrorists or snipers or other source threats utilizing bullets, lasers, shockwaves, emitting covert sonic sound wave devices (i.e. to cause loss of hearing), bomb fallout, infrared signatures, etc., can be located. Implementations of the present disclosure are also capable of identifying the direction and range of delivery systems such as drones, aircraft, boats, automobiles, humans, etc.

As described herein, some implementations are optionally autonomously activated via detection circuitry that upon detecting an external threat or condition, autonomously responds to the threat by aiming illumination devices towards the threat or by illuminating ideal escape routes or exits that are in a direction away from the threat. Such implementations can also provide detection generated announcements to the operator and civilians depending on the options, sensors and systems installed. In some situations, if desired, the platform may be programmed to operate autonomously, passively, controlled manually on the physical equipment or remotely operated away from the housing structure. Moreover, in an implementation, the threat identification device or system unveils threat positions autonomously, then instantly transmits a series of suggested defensive postures to be applied by the proposed targets. As used herein, unless the context clearly dictates otherwise, "autonomous" or "autonomously" means activating certain system components or executing instructions via a control unit or system without human intervention.

These announcements may be available to be broadcast to a security detail, a tactical response team, or other desired response groups, including potential victims. A single threat identification device may operate independently or separately within a group, controlled as a group or in a series of independent units within a group by a single operator, if desired. In any event, the implementations of the threat identification devices and systems described herein are designed to covertly detect and simultaneously transmit active threat's locations through vibration, sound, light, or other alerts, including notifications to wearable technologies. Some of the many advantages to such a system are the capabilities of identifying, tracking and broadcasting several separate active threats simultaneously.

Moreover, optionally the implementations of the present disclosure can identify the range, threat conditions and responsive measures by minimizing the electronics footprint of the systems, devices, and apparatuses, while keeping the direction detection capabilities via static zones fully operational. The threat identification devices and systems may operate as a permanent structure within a stadium or other populated areas. As such, the present disclosure is not limited to a standalone system. In certain implementations that include a housing, the housing may be custom designed according to the application, such as the housing divided into (i.e. integrated, connected in a series or unconnected in standalone systems) sub-quadrants or portions of quadrants, which allows the housings to be mounted on walls or other surfaces, such that the devices and systems of the present disclosure can be used in trains, boats, airports, businesses, residences, hallways, pass-trough's, etc.

Moreover, in an implementation, the threat identification devices and systems may identify birds or drones to alert aircraft pilots prior to takeoffs or landings at airports to avoid bird strikes or collisions with drones. Airports, schools or other controlled zones where simple and quick mobile set up surveillance systems may also be accommodated, as described herein. Further, the scope of the present disclosure includes a wide range of activities that are capable of future developing and expanding systems, from biological threat awareness sensors to announcing intentional or naturally occurring threats to people or animals, based on the components or sensors that are integrated into the threat identification device or system.

Implementations of the present disclosure are not limited to civilian use in response to threats, but rather, can be adapted for military or law enforcement use as well. In implementations designed for the military, the threat identification device or system can provide targeted proximity sensory threat identification, proactive broadcast actions (and reactions), friend or foe group and individual verification assurances, backup GPS guidance, identifying and locating soldier down alerts to avoiding friendly fire casualties of war, among other features. Similarly, a device or system directed towards law enforcement can provide proximity threat awareness systems, locating officer down alert scenarios, covert task force operational assistance, primary GPS guidance, and external broadcast announcements and platforms to detect instant situational riot condition assessments, among other functions. In some implementations, a civilian platform may include functionality to enhance personal broadcast provisions, primary GPS guidance, recovery solutions, determined sensor alerts, proximity threat awareness and responsive countermeasures, among others.

As described above, various implementations of the present disclosure may benefit to increase consumer confidences in public spaces while further deterring terrorists' actions due to the disclosed device and system functions, including expanding capabilities. As described above, while various implementations of the threat identification device or system itself can provide a deterrent for terrorists or those considering a terrorist act, visual system identification by civilians may also increase civilian confidence and safety assurance in attending public events. Defending oneself from avoidable threats are intuitive to perceivable and predictable outcomes. As one may surmise upon review of the present disclosure, preemptive actions increase proactive reactions by utilizing anticipatory sensory equipment to save lives. Individuals need to understand, accept and then adapt their behaviors towards imminent threat solutions, wherein the anticipatory sensory equipment ("ASE") and threat awareness countermeasures ("TAC") described herein are designed to aid individuals in such understanding, acceptance, and adaptation.

Locating "lone wolf" dynamic threat protocols hidden among thousands of people presents a unique set of challenges. Overcoming self-destructive instant "fight or flight" physical evolutional reactions within populations involve victims having to learn safer conditioned behaviors and apply those behaviors when the "fight or flight" reaction is initiated. In order to increase survival opportunities, a threat identification system may assist with defeating the emotion of fear first, then eliciting paradigm shifts to develop confidence as preemptive deliverables are achieved. Adversaries prefer to avoid attacking targets using hand guns or close contact weapons because they have to be proximate to the target to fire or use the weapon, which increases the likelihood that they will be disarmed. In many cases, a terrorist's goal is to inflict the heaviest causality toll to as many vulnerable "soft targets" as possible while initiating and expanding public hysteria as much as possible. Terrorists rely on creating terror and confusion for more than just effect, as that chaos provides a cloak to escape under with the least amount of effective risk to themselves so that they may terrorize again. On the other hand, as technological solutions are increasingly adopted by the general public, public confidence is increased in threat identification devices, systems, and methods.

The implementations of the present disclosure expand the ability to broadcast threat announcements publicly or discreetly, while enabling use of any other available source information platforms. Receiving a private announcement, alert, message, indication, in combination with activate countermeasures described herein, enables potential victims to enjoy a defensive tactical advantage. For example, utilizing mobile technologies, advancing cell phones, smart watches and other wearable or carriable technology apparatuses delivers proactive opportunities through perhaps a temporary SMS opt-in or opt-out emergency service. Crowd sourcing can also be utilized to generate additional threat information from perspective victims that are safe. Other functionality of the implementations described herein may include preemptive planning against attacks by knowing the risks and preparing for action by directing users "how and where" to react in response. Proposed victims may be reassured with "peace of mind" confidences in knowing that they will become immediately aware of how to respond by the implementations of the present disclosure if any critical incident may arise.

In an implementation, systems and devices of the present disclosure include a housing with perimeter sensing zone tubes that offer protected directional radial areas around an environment while providing information on how to respond to a threat for survival, as described in more detail herein. In some implementations, the threat identification devices and systems disclosed herein may use compact high performance electronics and other digital sensing systems that create heat, which heat may be transferred to a metal housing. The metal housing may act as a heat sink to further dissipate heat energy as one exemplary, not limiting conduction-cooling method.

As described herein, the various implementations of the present disclosure are operable to actively scan for threats throughout adjacent areas around the threat identification device or system by utilizing a plurality of tubes, which may also be referred to as zone tubes. Such zone tubes can maximize source solutions by focusing within specific testing areas, and which may enable sensors paired with the zone tubes to experience computational efficiencies by avoiding using interface energy on wasted space or areas which are the responsibility of other zone tubes. Furthermore, the various implementations of the threat identification device or system may enable a controller, control unit, or any associated computing equipment communicably coupled with the sensors to achieve faster computational determinations. As such, the zone tubes of the threat identification device or system can narrow the scope of the region and/or area being sensed, which empowers efficient use of complex algorithms to rapidly find a threat solution.

In an implementation, the threat identification systems and devices described herein include a test mode (i.e. a start-up mode or a calibration mode) which is activated through a control unit or system, wherein the test mode includes a light source, such as a laser, associated with each tube. During the test mode, the light source emits light from each tube, which propagates outwards from the respective tube and highlights the sensing area of the tube. The tubes can then be adjusted, either in terms of position, size, or orientation, for example, to create minimal overlap between the tubes while maximizing sensing coverage. Adjusting the tubes based on the test mode ensures that there is no significant overlap between sensing zones, which reduces or eliminates wasting system resources are repetitive sensing zones.

In some implementations, as described herein, the threat identification device or system is capable of locating and isolating a shooter inside a stadium or any other building or structure within nanoseconds after firing the first shot. In particular, the threat identification device or system may operate by triangulating the source of the external condition, which may be a gunshot, in a non-limiting example. A control unit may operate to determine the location and range of the external condition based on geometry between the unknown external condition location and the known position and orientation of the zone tubes.

In some implementations, sensors, microphones, or other detection features are arranged based on specific zones or quadrants to reduce the calculations required to identify the threat. For example, rather than identifying a threat anywhere within a three dimensional plane, certain tubes may be assigned to specific quadrants, such that when an external condition is detected, the controller is informed of which quadrant or zone the threat came from. This information allows the system to eliminate information from the other quadrants, thus reducing the number of calculations.

In yet other implementations, the threat identification device or system may include protection devices or similar components that are sized and shaped to be received in the housing that cover sensing equipment to protect from damage from the shooter or other threat. Such protection devices may be steel sheaths or covers, or a lining of bullet proof material, such as Kevlar®, for example. In some implementations, the threat identification device or system may adapt sensing zone coverage if certain tubes or sensors are disabled. For example, if various zone tubes within the threat identification device or system become inoperative, the threat identification device or system may include articulating joints at the base of each tube, which are operated by an actuator in electronic communication with a control unit, to change the direction of the tubes to cover the area eliminated by the inoperative tubes and sensors. Responding to inoperative tubes may also include adjusting sensor elevations within each tube in order to vary the sensing scope.

As such, the threat identification device or system may operate despite having some damaged zone tubes within a single sensing area. Moreover, due to the number of sensors and tubes included in implementations of the present disclosure, it is implausible that a shooter, or other threat, could destroy all of the sensors or tubes so as to generally inactive the system. By contrast, conventional systems may be damaged by one single shot into any part of a structure. Furthermore, if a threat perpetrator diverts attention to damaging the systems structure, the threat identification device or system would be able to identify and announce the location of the threat, as described herein, which would be beneficial in providing time for people to escape the stadium or building structure that incorporates the threat identification device or system.

In some implementations, as described herein, the threat identification device or system may include multiple zone tubes within one single static housing system, which may operate as a standalone self-sufficient threat location device. In other implementations, as described herein, the threat identification device or system may include multiple housing systems, wherein control units of each housing system are in electronic communication to form a threat identification system. In other words, multiple individual threat identification devices, each with a housing and a control unit, may be linked to form a threat identification system. Such a threat identification system may operate to provide further precision in identifying the location of a threat perpetrator by using, for example, various angular orientations directed to the target. For example, in some implementations of the threat identification device or system, two individual threat identification devices may be positioned on geographic opposite ends of a stadium, which will increase and/or improve triangulation coordinates to locate the threat perpetrator, while reducing the error potential. In other words, if each threat identification device produces information corresponding to the location of the threat, the location information can be compared, and an overlap between the information can be analyzed to more accurately determine the threat location while reducing the potential for error associated with only a single locating determination.

The threat identification device or system may promptly, for example, within a defined threshold, such as a few seconds, provide real-time broadcasting of actionable threat response guidance for how people may offensively attack or defensively protect themselves against a threat. In an implementation where the threat is a projectile, such as a bullet, the projectile's trajectory is estimated using a plurality of sensors. For example, as sound from a gunshot, for example, travels from the gunshot location, it will reach different tubes and different sensors at different times. Based on the position of the sensors and the tubes, an approximation of the trajectory can be determined. For example, for a gunshot fired below and to the left of the threat identification device, sound would be detected by sensors at the bottom and on the left of the threat identification before sound would be detected on the top and the right. In this way, a projected path of the projectile, or trajectory, can be estimated.

Each following projectile's trajectory could be estimated in a similar manner, and compared to the first projectile reading, or earlier projectile readings, to account for errors in location, or to increase accuracy in locating the shooter. Using several separate independent platforms at different geographic locations would reduce the time required while increasing accuracy for locating the source of the gunshot. For example, where multiple threat identification devices are used, the source of the shot can be triangulated based on an intersection between the projected location determined by each of the threat identification devices, as described above.

In some implementations, the threat identification device or system described herein may include a plurality of lasers connected to a stand or pole that supports a housing. In such implementations, the threat may be illuminated by separate wide-beamed lasers pointing towards the threat and any associated broadcasting, e.g., public announcements. For example, in some implementations, the threat identification device or system may illuminate the threat location via an intense bright <2-degree narrow super beamed spotlight with a fully articulated moving head. In other implementations, each threat identification device or system may include at least one high intensity focal impact strobe light to disrupt the threat perpetrator. For example, such a strobe light could be directed at a threat perpetrator to temporarily blind and disorient the perpetrator or perpetrators from effectively continuing their attack or locating targets. In yet further implementations, the high-intensity optic laser beams may isolate and draw a tight pattern encircling the shooter to further target the threat perpetrator. In some implementations, the threat identification device or system may selectively direct high powered lasers into a threat perpetrator's eyes as a defensive countermeasure.

As described herein, in some implementations of the threat identification device or system, several devices or independent subsystems are mounted on a single support so as to avoid possible function failures. For example, if one targeting laser or strobe light referenced above is "line of sight" blocked by a temporary object or by a permanent obstruction, then the threat identification device or system can use another laser or strobe light on the support that is not blocked in order to accurately target the threat. For example, the threat identification device or system can include at least 3 independent targeting lasers and at least 3 independent strobe lights evenly distributed about the support pole so as to enable 360 degree illumination capabilities for the targeting lasers and the strobe lights. Alternatively, implementations of the present disclosure may include an autonomously activated backup laser or lighting system that is either coupled to the stand or located remote to the stand and activated automatically when an obstruction is detected or the primary system is otherwise disabled. For example, in a stadium, the backup light system could include activating existing permanently mounted perimeter lights or a set of unobstructed video panels mounted around the stadiums walls.

In some implementations, laser light can also be directed to impinge onto a retroreflector, which is a super reflective device that creates an electromagnetic wavefront image. Such a wavefront may measure a reflected wave source back in the opposite direction and along the same vector parallel that introduced the image from the point of origination. As such, a retroreflector can be used to display laser light as an image or a band of color, which may be used to identify a preferred exit, or an area to exit. In addition, the threat identification device or system may be in electronic communication with video panels in a stadium or other building structure that may be used with various colors or instructions to indicate conditions and response options to potential victims. Such instructions may include "Run TO Green" or "Run FROM Red" which may be displayed onto parameter lighted panels around the stadium. In yet a further implementation, the threat identification device or system may selectively, intermittently, and/or temporarily allow wireless connection to a mobile electronic device to provide an alert or instructions either independently from, or in addition to, audible instructions issued over a public-address system. Such alert or instructions may identify safety areas and exit strategies, which may be preset, predetermined, cleared and/or approved before activating the system. For example, such safety areas and exit strategies may be determined based on instructions and/or guidance from stadium security details or managing agencies, such that upon initiation in response to a threat, the threat identification device or system can accurately direct potential victims to safe exits. Using a stadium as one non-limiting example, security personnel could identify which exits are safe to use in response to a threat in a given section of a stadium (i.e. if the threat is in Section A, proceed to exits B, C, and D). This information can then be programmed into software associated with the control unit, such that if the threat is identified in the given section, specific response instructions can be distributed to spectators at the event.

In implementations where the threat identification device or system is incorporated in a permanent structure within a stadium or building structure, the test mode described above could be executed automatically as an aspect of activating the system. Still further, the test mode could be activated during system operation to ensure that the system is functioning properly and as a test to confirm coverage areas. In some implementations, visual confirmations around the stadium may be implemented to verify the system is functioning properly and confirm calibrated coverage areas within each zone tube's area. In one non-limiting example implementation, an operator may run a setup program displaying all angles and elevations for correct dot checks in a pattern projected onto the interior structure around the stadium or building structure. Periodically visually verifying the confirmation test grids can be further implemented to assure proper spacing, matching positioning and zone alignment is completed and ready to receive sensing readings. In some implementations, the threat identification device or system may reflectors positioned around the structure that echo or provide an audible test sound during the test mode if the test lasers are not operating properly. Such reflectors may also be mounted on a mobile device, such that the reflectors can be transported with the system to the location, in implementations where the system is mobile. Such checks could also provide proof to people in the stadium or public venue that the system is functioning, which would increase consumer confidence in attending an event.

In various implementations, a shape of the housing for the zone tubes is round, square, rectangular, oblong or irregular, among other options. Further, the housing may be mounted on the surrounding walls or any structure within a given venue. The housing the threat identification device or system may be elevated above a playing field or on a wall in order to prevent interference. The housing may be a permanent structure or on a mobile mounted system. In some implementations, the threat identification device or system may be elevated with hydraulics or other lifting mechanisms based on the desired sensing results. In other implementations, for example, where the desired sensing is for bio-toxins, the threat identification device or system may optionally not be elevated. As described herein, an exterior surface of the housing may have various sized diameter tubes installed. The number of tubes included in the housing of the threat identification device or system may be selectively determined based on the type of sensors installed in the device or system. The tubes may be flush mounted, internally hidden or extruded variably about the housing. It should be noted, however, that the tubes are not limited to being round or cylindrical, but rather, could also be unusual shapes that draw sound in or any shape that facilitates sensing capabilities of the threat identification device or system. Moreover, the sensors can be positioned at different elevations relative to the tubes, or the tubes can translate to change the position of the sensor relative to the tube, for example, via actuators or other motors coupled to the tubes. As one non-limiting example, a high-frequency microphone with directional sensors can process velocity data acoustically by digitally reconstructing the duration, profile, and the direction of the shot. In some implementations, sensing zones for the tubes may be designed to be similar to the longitude and latitude of a Globe. Alternatively, sensing zones may be distributed accordingly to predetermined control areas, wherein each control area is covered by at least one tube. Larger control areas may preferably or optionally include multiple tubes covering the area, so as to increase accuracy within the larger control area.

Using a plurality of tubes installed on a housing enables sensing of a variety of threats, from sounds to infrared camera alerts (i.e. including use of night-scopes on a weapon). Systems and devices utilizing this disclosure's "smart zone tubes" may provide precise and close observation sensing opportunities for narrow targeted security areas. In an implementation, cameras are mounted within zone tubes, wherein the cameras trigger property intrusion surveillance alarms in response to an intrusion. Moreover, the threat identification device or system can be further protected because the sensing equipment is protected and offset inside of housing, which is preferably constructed of military strength steel, so as to be impenetrable by most common bullets, in addition to handheld weapons.

As described above, an implementation of the threat identification device or system may include sensors for identifying certain type of toxins, along with broadcast circuitry to notify populations if levels become alarming or overly harmful. For example, if the readings identify a toxin, one or more implementations of the threat identification device or system may direct populations to evacuate or how to respond (e.g., with guided instructions), and the threat identification device or system may communicate with an appropriate government agency. Still further, the threat identification device or system may use a negative pressure differential in the housing to draw the particles through the zone tubes to identify radiation, biohazards or airborne toxins. In some situations, various toxins are heavier than air and travel along the ground, and as such, the base supporting the housing can be used as a point of entry to detect such toxins.

Moreover, the threat identification device or system may determine which direction the pathogen came from by specifying which zone tube or tubes detected the pathogen, and in what order. For example, a pathogen will be carried by the airflow in a venue. As the pathogen moves past the threat identification device or system, certain tubes and sensors will detect the pathogen before others, which allows the system to determine the direction of the pathogen according to the position and the order of the tubes that detect the pathogen. The airflow may transition through the zone tubes, through each of the sensors and then to an exhaust, which may additionally be sized and shaped to be the stand, pole or post. Several known air-delivered environmental chemicals may be identified within rapid duration, for example, one millisecond of receiving a testing sample, further resulting in a total test hazard reading being completely tested within a few seconds. Unknown toxins may have some tracers of known properties that may help identification. Some sensors may be alerted to yet unidentified chemical properties. In certain implementations, sensors may be adjusted to different depths of the tubes to expand the sensing coverage or narrow and reduce the sensing coverage. In some implementations, the sensors may selectively be positioned deeper into the zone tubes to narrow the sensing fields. By contrast, positioning the sensors proximate to the top of the tubes would widen the sensing fields, as the sensing fields generally expand conically outward from the sensor. An additional implementation is for the bio-testing to be conducted within the base of the structure before the vacuum air system exhausts out of the base unit.

Furthermore, zone tubes may be selectively interchangeable depending upon the needed width or length of the sensing system. For example, in implementations where the threat identification device or system includes narrow, longer zone tubes, the threat identification device or system may include a large number of tubes in the housing to offset for the tighter sensing areas per tube. By contrast, in implementations where the threat identification device or system includes shorter or larger diameter tubes, the threat identification device or system may include a smaller number of tubes because the increases in coverage area can allow for larger sensing areas. Sensing methods may also be adjusted depending on the sensors and size of zone tubes needed for the testing area required while scanning a specific sector. For example, one sensor may serve one tube size while additional sets of sensors may be used in varying tube sizes or depths depending on preferred sensing specifications. Several sensors may be placed in larger diameter tubes and share the same space without diluting testing zone results. Smaller tubes may be used towards greater threat areas and wider or shorter tubes may be used towards minimal threat areas, in one implementation.

Zone tubes may rotate, pivot, point, target, turn, extend, or change direction via an articulating joint and associated actuator in order to target location specific areas of surveillance zones relative to an active threat. As such, if a threat is detected, the tubes can turn in the direction of the threat to increase sensing accuracies for a continuing threat, such as an active shooter. Moreover, the tube orientation and direction may change based on updated readings of the threat itself (i.e. if the threat changes position, as identified by multiple detected events).

In an implementation, one sensing mechanism may be installed with one single tube for one single sensing application at the end of a long hallway, in one non-limiting example, to sense for one specific region for a single expected condition. In some implementations, a number of sensors may be provided in a grouping of zone tubes as "swarm sensing" technology advancements will provide more efficiencies with less read errors being announced or alerts being erroneously broadcasted. "Swarm sensing" generally refers to the ability of multiple sensors to work together to accomplish a common task, which reduces the inefficiencies associated with a single sensor accomplishing the same task. For example, determining the direction of a threat is much more difficult with a single sensor than with multiple sensors and as such, swarm sensing enables control units associated with the threat identification devices and systems described herein to more accurately determine the location of the threat, among other characteristics, by analyzing the data from multiple sensors working together. In other implementations, software associated with the threat identification devices or systems can be operable to filter out sensor registers from existing ambient noises and predictable volume levels. For example, the threat identification device or system may process impulse sound characteristics and then compare the expected tested ambient noise level effects as the base for noise comparison parameters. Existing noise levels may be compared to fluctuating barometric conditions, density altitude, wind and dew point updates to deliver accurate testing samples.

Moreover, implementations of the present disclosure can include techniques to account for environmental conditions and reduce the error rate associated with identifying a location of a gunshot. For example, where the electromagnetic spectrum of a vacuum frequency of air is 29.92 barometric pressure, sea level standard temperature is 15 degrees C./59 degrees F. In this example, it is expected that environmental test conditions will occur in 1 nanosecond and results are usually evident within 2 seconds, while acoustic air is analyzed to start at 1 millisecond depending upon the adiabatic laps rate. Each zone tube will conduct automatic individual tests and compare separate periodic test samples with group findings throughout several other testing/sensing zones or systems around the stadium or event venue regarding air quality. Based on this information, ballistics, ordinance, caliber sizes and projectile's force velocity decay to gravitational drop rates with atmospheric parasite friction drag may be identified and such information can be transmitted to the control unit for adjusting the detected location and projected trajectory of a bullet.

The implementations described herein may work in unison with the various implementations of wearable platform described in the present inventor's U.S. patent application Ser. No. 15/543,198 and Patent Cooperation Treaty Application No. PCT/US15/64080, which are incorporated by reference herein in entirety. For example, implementations of the present disclosure may direct users of the wearable platform to the threat's location autonomously with signals, vibration pulses, or beeps, for example, via signals received from implementations of the present disclosure. As such, implementations of the present disclosure enable the ability to provide directional cues as a wearable guidance system by autonomously commanding the user to navigate the surrounding areas safely. Additionally, such implementations avoid giving the terrorist defensive cues by easily seen visual instructions or public verbal announcements.

In other implementations, along with using the targeting lasers or lights, the various implementations of the threat identification device or system may cooperate and/or include drones in a supporting role as a targeting measure with video backup. Such implementations may cooperate with, or include, a stand-alone drone or stand-by drones which may fly to target the threat perpetrator.

In some applications, the various implementations of the threat identification device or system described herein may also assist with identifying and defending against threats from unmanned aerial vehicles ("UAVs"). For example, in some implementations, the threat identification device or system may include several laser weapons systems such as, for example, Ku-band tracking radar to autonomously acquire targets in the event that other sensors on the vehicle are disabled in combat. Further, the threat identification device or system may include an electronic warfare jamming system intended to take out the signal of enemy drones. Such lasers included in the threat identification device or system can operate as silent defense and attack, which can provide a substantial tactical advantage as it can afford attack vehicles the opportunity to conduct combat missions without giving away their position. Such lasers included in the threat identification device or system may comprise low-cost high intensity lasers that are capable of destroying targets instead of expensive interceptor missiles. Mobile-power technologies, targeting algorithms, beam control and thermal spot management technologies can be applied to utilize lasers, in conjunction with the implementations of the present disclosure to provide countermeasures against UAVs.

In further implementations, the threat identification devices, systems, and methods described herein further include at least one high powered laser capable of disabling a UAV, such as a drone. The threat identification devices and systems can use sensors to detect the UAV, including, without limitation, radar or sensors configured to detect transmission of wireless control signals (i.e. radio signals) between a drone and a drone operator who is manipulating a controller in electronic communication with the drone. The location of the drone operator may also be identified according to such signals, wherein the position of the drone operator is triangulated based on the intercepted electronic signals.

Moreover, any approved UAVs, such as, for example, those used by a TV station to broadcast an event, could be preregistered with the control unit of the threat identification device or system in order to assist in identifying friend or foe UAVs. Such preregistration may be supported by the Federal Aviation Administration ("FAA"), who are responsible for granting permission to utilize UAVs and as such, before an event, a registry of preapproved UAVs could be uploaded to the threat identification device or system. When a foe UAV is detected, sensors send a signal to the control unit of the threat identification device or system, which then triangulates and identifies the position of the operator based on the signal from the sensors. Then, the control unit outputs a second signal to the high power laser to track and disable the zone. This process may occur autonomously, or the control unit may transmit a prompt to an operator, such as security personnel or police, identifying the foe drone and allowing for the operator to decide whether to initiate the laser as a defensive countermeasure. As such, these implementations go beyond simple radio frequency jammers to disable drones and enable early detection, identification, and neutralization of a potential UAV or drone threat.

As such, the present disclosure provides devices, systems, and methods for rapidly detecting a variety of threats that can be introduced into populations of various sizes, as well as defensive countermeasures to assist potential victims in avoiding and otherwise defending themselves against the threat.

Figure 1B:
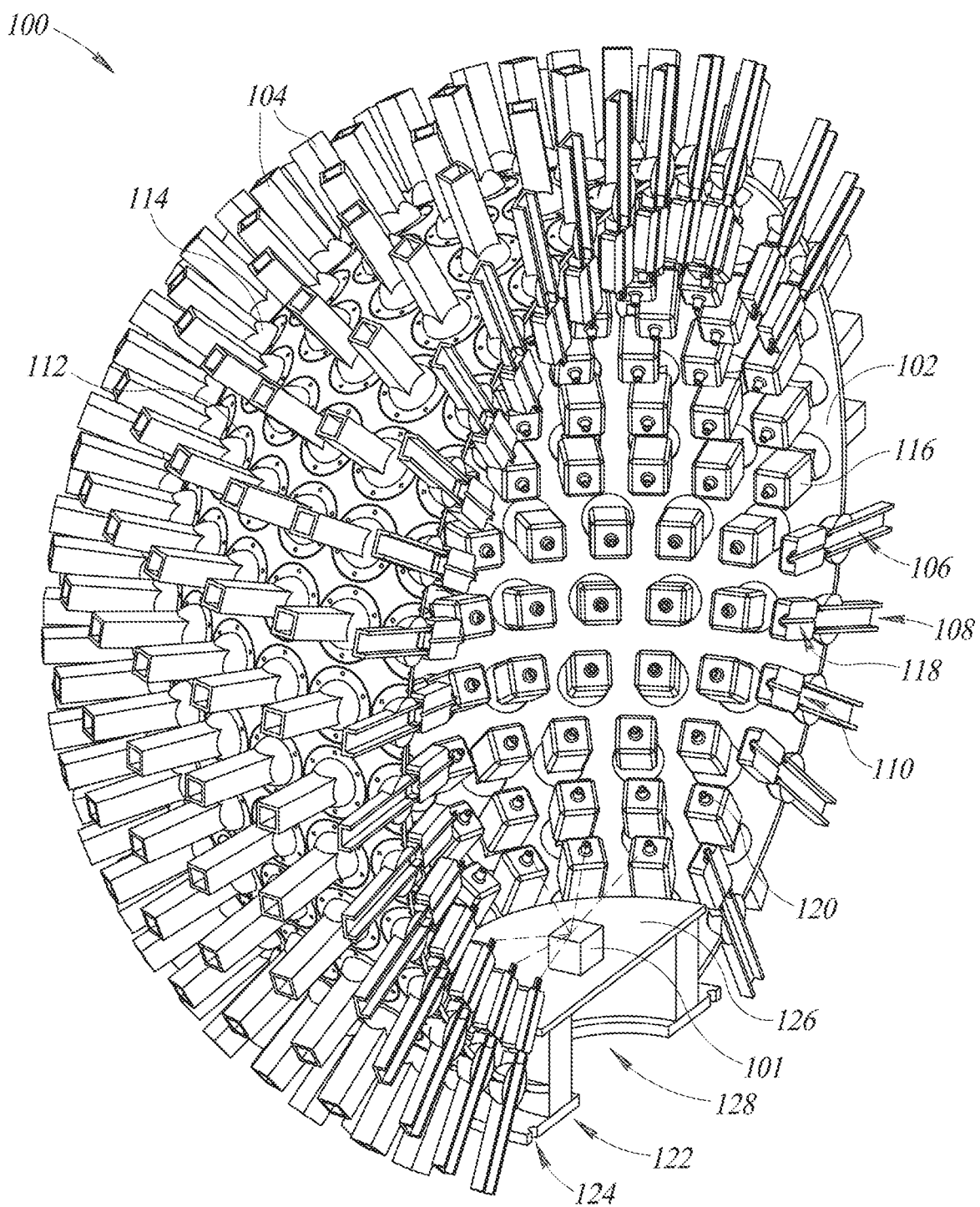
FIG. 1B is a perspective cut-away view of an alternative exemplary implementation of a housing having a plurality of tubes extending from the housing.
Figure 1C:
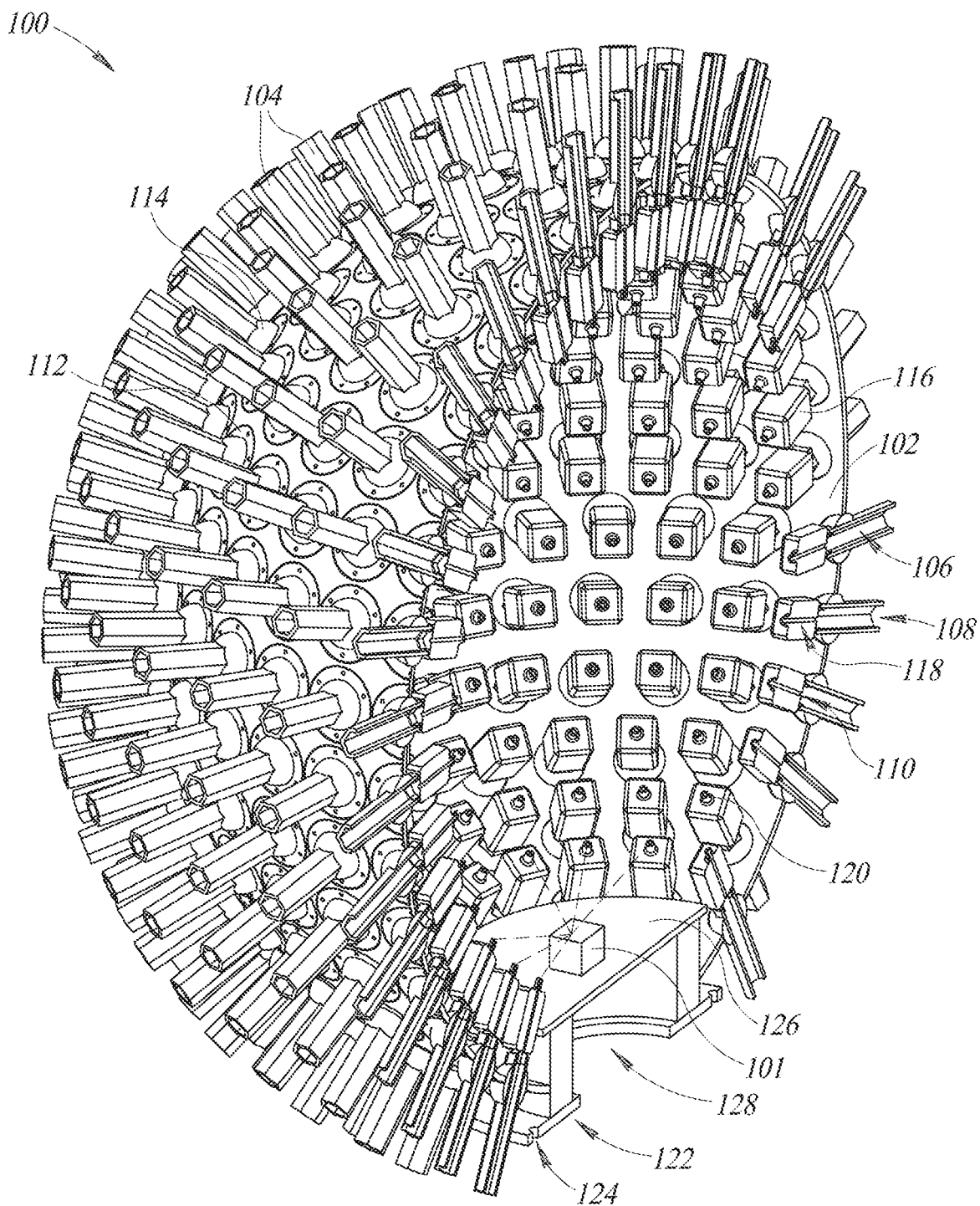
FIG. 1C is a perspective cut-away view of an alternative exemplary implementation of a housing having a plurality of tubes extending from the housing.

Turning now to the illustrated implementations, FIGS. 1A-C illustrate alternative exemplary implementations of a housing 100 of a threat identification device or system with a body 102 including a plurality of tubes 104 coupled to and extending outwardly from the body 102. Each of the plurality of tubes 104 can be formed with a different shape or configuration. For example, in FIG. 1A, the plurality of tubes 104 are generally cylindrical, or have a constant circular cross section along their length or height. In FIG. 1B, each of the plurality of tubes 104 are square or rectangular in shape, or have a constant square or rectangular cross section along their length or height. In FIG. 1C, each of the plurality of tubes 104 are hexagonal in shape and have a constant hexagonal cross section long their length or height. As such, the present disclosure is not limited by the shape or configuration of the plurality of tubes, but rather, any rectilinear or polygonal shape is within the scope of the disclosure. Moreover, it is contemplated that the tubes 104 could have irregular shapes designed to detect sound, for example, or conical shapes to amplify an output signal or focus an incoming sound or light. Further, each of the tubes 104 may have a stepped configuration, or a continuous taper along the length or height.

While the body 102 is illustrated as generally being spherical in shape, it is also to be appreciated that the body 102 could be square, rectangular, trapezoidal, hexagonal, or any other rectilinear or polygonal shape. Further, the body 102 could be formed as a segment of any these shapes, such as a hemisphere, or a quarter of a sphere in implementations where the body 102 is a sphere. In implementations where the body 102 is a sphere, the body 102 can have a 60 inch diameter, or more or less. Moreover, in various implementations, each of the plurality of tubes 104 has an outermost dimension that is greater than, less than, or equal to 2 inches and a length or height that is greater than, less than, or equal to 9 inches. The body 102, as well as each of the plurality of tubes 104 can be formed from various metals. For example, in some implementations the body 102 as well as each of the plurality of tubes 104 can be formed from military grade steel so as to be able to withstand gunshots without puncturing. However, other materials are contemplated as well, including aluminum, carbon fiber, and plastic, among others.

Each of the plurality of tubes 104 includes a longitudinal axial bore 106 extending along a length or height of each tube 104 from a first opening 108 to a second opening 110. Each of the tubes 104 is coupled to the body 102 via a base plate 112 which has a central aperture 130 through which the tubes 104 extend. In an implementation, the tubes 104 are permanently coupled in position, while in other implementations, the tubes 104 are connected to an articulating joint 114 coupled to the base plate 112. In implementations where an articulating joint 114 is used, each of the tubes 104 can be rotated about the articulating joint 114. Moreover, each of the tubes 104 preferably translates between a first position and a second position, as described herein, or in other words, a portion of each tube 104 extending from the body 102 is preferably adjustable, such that each tube 104 can have a different height relative to a surface 132 of the body 102 than the other tubes 104. For example, one or more tubes 104 can have a larger height relative to the other tubes 104.

The housing 100, and more particularly, the base 102 further includes a plurality of sensor enclosures 116, which house one or more types of sensors. As described above, the sensor enclosures 116 may be interchangeable, wherein each enclosure 116 houses a single type of sensor, and other enclosures 116 housing a different type of sensor are exchanged in order to provide different sensing functionalities. Although FIGS. 1A-C illustrate one sensor enclosure 116 coupled to a corresponding one of the plurality of tubes 104, in other implementations, one sensor enclosure 116 may be connected to a group of tubes 104. Moreover, while the sensor enclosures 116 are illustrated as coupled to the tubes 104 at the second opening 110 of each tube 104, in other implementations, the sensor enclosures 116 are located within each tube 104 at different heights, or in yet other implementations, the sensor enclosures 116 remain stationary and coupled to the body 102, while each tube 104 translates over the sensor enclosure 116, such that the position of the sensor enclosure 116 and the sensors generally with respect to the tubes 104 can vary.

The sensors can take a wide variety of forms. For example, one or more of the sensors can take the form of acoustic sensors, optical sensors, heat sensors, gyroscopes, accelerometers, magnetometers, inertial measurement units (IMU), E-field sensors, proximity sensors, e.g., motion sensors, time of flight sensors, force sensors, active or passive infrared sensors, shockwave sensors (i.e. to determine bullet caliber according to shockwaves that are unique to bullet caliber), or any other type of suitable sensor, any combinations thereof, and/or an array of any one of these sensors. For example, in some implementations, one or more of the sensors can detect muzzle sounds, bullet shock waves, heat, motion, etc. The design of each of the tubes 104 associated with the sensor enclosures 116 may focus the sensing area for the sensor. For example, the sensing zone for each sensor will radiate outwards from the first opening 108 in each tube 104 according to the geometries of the tube 104. Thus, the use of tubes 104 with different sizes enables selecting tubes 104 that correspond to a desired sensing scope.

Further, while FIGS. 1A-C illustrate a plurality of identical tubes 104 evenly dispersed across the body 102 and extending generally radially outwardly, it is to be appreciated that in some implementations, the housing 100 will include tubes 104 of various sizes, lengths, shapes, and orientations, depending on the application. Some tubes 104 may also be held closer to the surface of the body 102, so as to bring the sensor enclosure 116 and the sensor associated with that tube 104 closer to the first opening 108 so as to broaden the sensing scope. As noted above, the tubes 104 are interchangeable so that adjusting or replacing tubes 104 is easier. In addition, focusing the sensing area via the tubes 104 allows for easier location of a target as compared to an externally located sensor without a tube because in that case, the sensing zone is very wide (i.e. the sensing zone spreads out conically, without restriction from a tube) and as such, complex calculations would otherwise be required to accurately triangulate the source of the sensed condition. By comparison, the tubes 104 allow for a wide sensing area due to the number and arrangement of the tubes 104 while also enabling accurate threat detection through focused sensing zones.

In other alternative implementations, each of the sensor enclosures 116 includes a wire channel 118 and a terminal 120, such that each of the sensor enclosures 116 can connect, via wires (not shown) between the terminal and a controller, such as the controller described with reference to FIG. 2C. In such implementations, wires (not shown) would extend through the wire channel 118 to a sensor positioned within each tube 104, wherein a position of the sensor (not shown) with respect to each tube 104 can be varied manually or automatically by adjusting the position of the tubes 104. In other implementations, each of the sensor enclosures 116 will include hardware to enable a Wi-Fi connect or a Bluetooth® connection to the controller or an external processing unit or computer. In these implementations, such hardware may include, but is not limited to, a radio, a receiver, or a transceiver that communicates via electromagnetic waves within the defined protocols of Wi-Fi or Bluetooth® systems.

The housing 100 may further include a base 122 with a cavity 128 for coupling to a pole or other support structure, as described herein. Such coupling may be secured through use of fasteners inserted through apertures 124 around a perimeter edge of the base 122, or welding, or any other coupling structure. Moreover, the cavity 128 can be covered with a plate 126, which in certain implementations is permanently coupled to the base 122 while in other implementations, is removably coupled to the base 122 so as to allow access to an interior of the housing 100 and the body 102. Although not specifically shown, it is to be understood, upon review of the present disclosure, that the plate 126 can also include an aperture for allowing wires (not shown) to pass through to a controller located external to the housing 100.

In yet further implementations, each tube 104 can include a laser (or a single laser with a plurality of apertures aligned with the tubes 104) aligned to emit light through each tube 104, such that during a testing mode prior to system activation, laser light is emitted through each tube 104 and expands to visually indicate an approximation of the scope of sensing coverage for each tube 104. The body 102 acts as a heat sink for the electronics housed within the body 102, such as the sensors. As each of the components of the housing 100 are preferably comprised of metal, heat generated by operation of the electronic components within the housing will be transferred, through induction or convection, for example, to be dissipated by the body 102. Because of the preferably large size of the body 102, such heat can easily be dissipated without concern of the body 102 becoming too hot.

In certain other implementations, the wire cavities 118 are open and a negative pressure is created within the housing 100 and the body 102 through use of a fan, or other pressure drop device, such that air is sucked or drawn in to the housing through the tubes 104 in order to draw air, which may contain toxins, for example, past the sensor enclosures 116 such that the sensors can detect toxins within the air. Similarly, in order to create a countermeasure against toxins, the negative air pressure differential can be reversed to create a positive pressure differential upon detection of a toxin, such that a neutralizing agent is output through the plurality of tubes 104. For example, in some implementations, the tube(s) 104 or other enclosure within the housing 100 may include a compartment that includes one or more neutralizing agents. In such implementations, the air pressure differential can be created through an aperture in the plate 126 with a pressure drop device, such as a fan or a blower, located external to the housing 100 and the body 102.

Figure 2A:
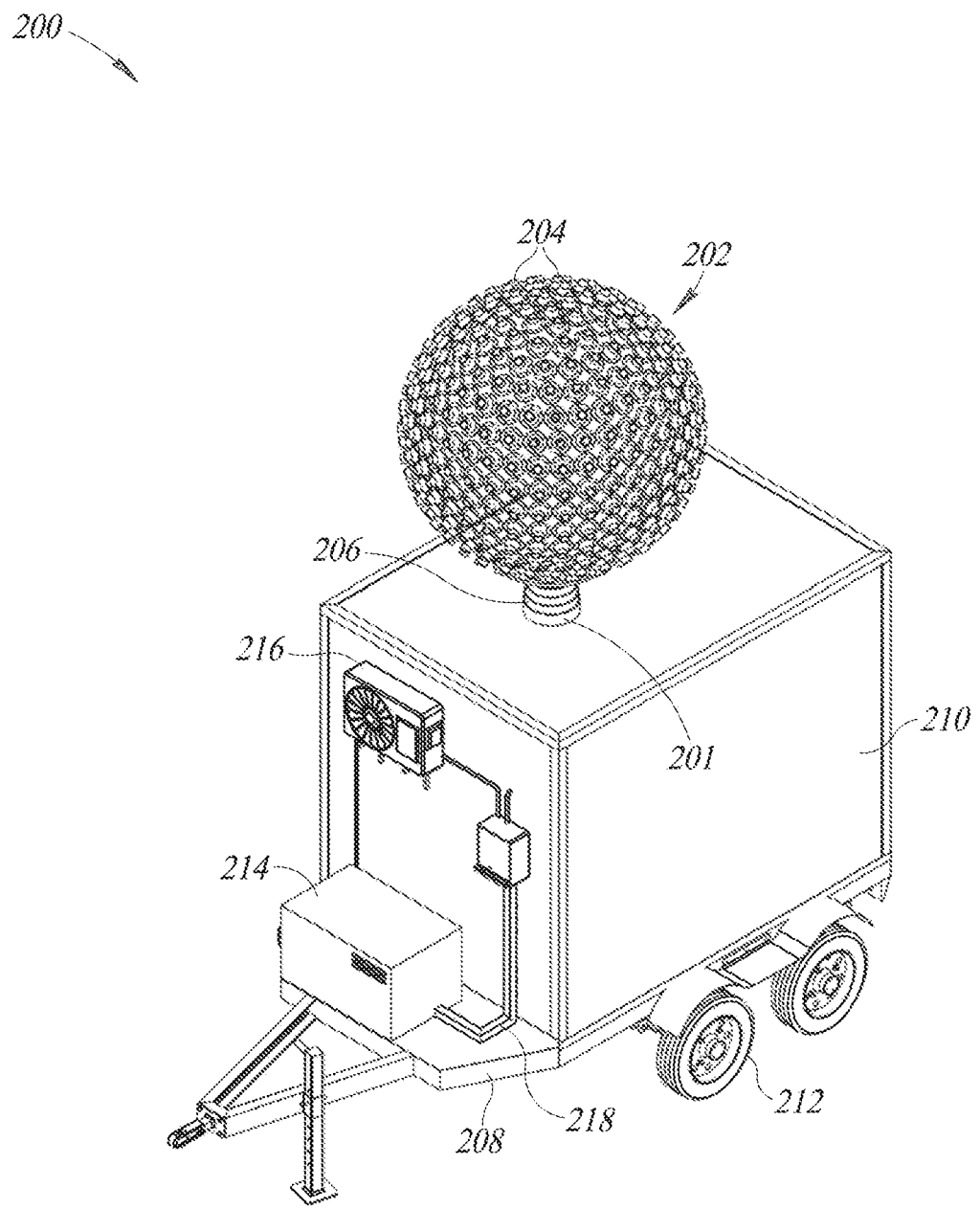
FIG. 2A is a perspective view of an exemplary implementation of a threat identification system including a threat identification device coupled to a trailer housing a control system, with the device illustrated in a first position.
Figure 2B:
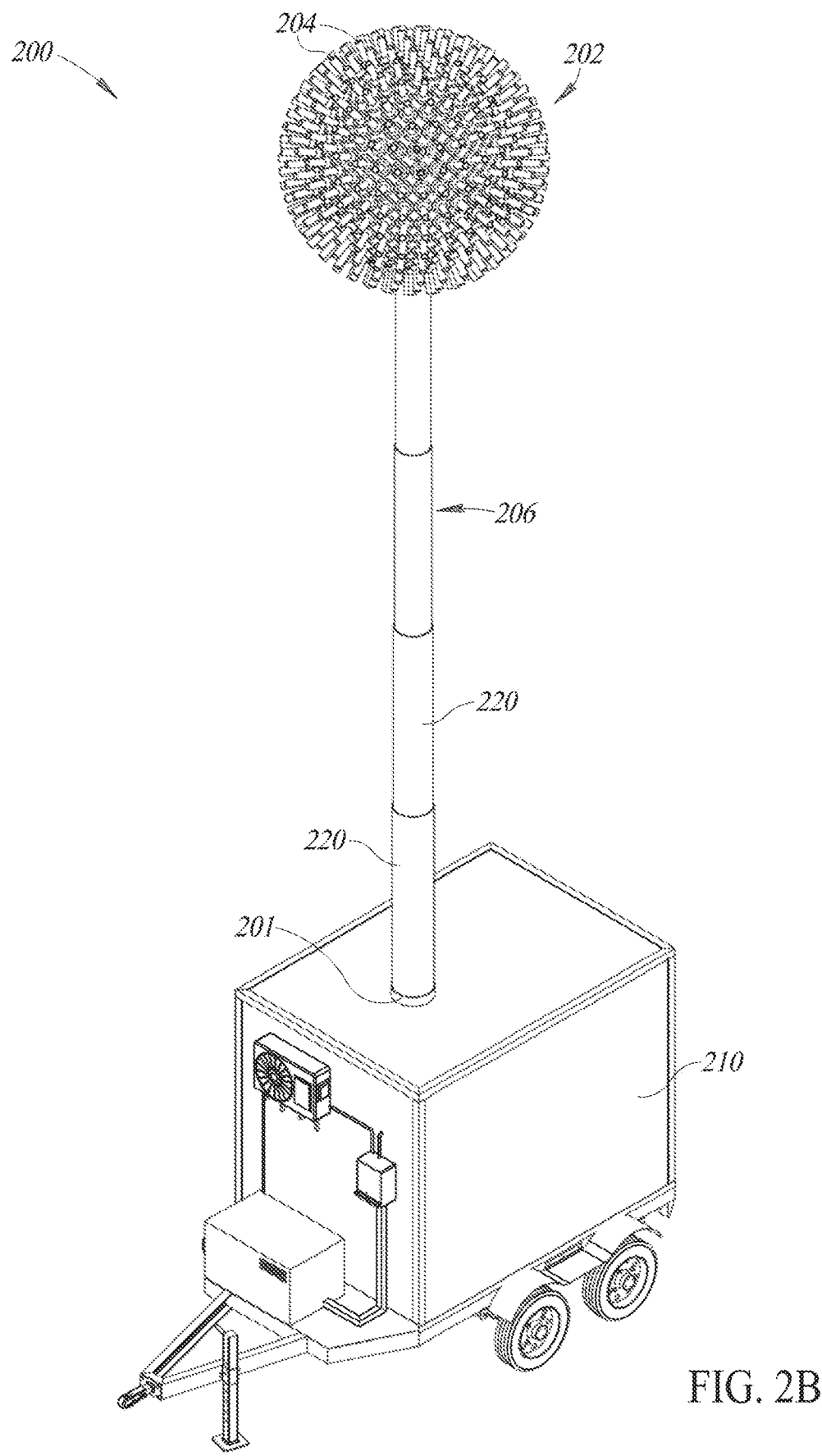
FIG. 2B is a perspective view of the threat identification system of FIG. 2A illustrating the device in a second position.

FIGS. 2A-B illustrate an implementation of a threat identification system or device 200 that is coupled to a trailer 208 via a support 206 that protrudes outwardly from the trailer 208. The trailer 208 is generally operable to facilitate the device 200 being mobile such that it may be transported to an event, or once the device 200 is located at an event, the device 200 may be repositioned in order to optimize the sensing capabilities according to obstructions or desired sensing areas. The device 200 includes a housing 202 with a plurality of tubes 204 coupled to and extending from the housing 202. The housing 202 and the tubes 204 may be substantially similar to the implementations of the housing 100 and the tubes 104 described above with reference to FIGS. 1A-C and as such, description of these features will not be repeated.

FIG. 2A illustrates the device 200 in a first position, with the housing 202 located proximate to base 210 mounted on the trailer 208 and each of the plurality of tubes 204 located proximate to the housing 202 (i.e. in an unextended position). In other words, the first position corresponds to an inactive, undeployed, and/or transportation configuration of the device 200. The trailer 208 includes the base 210, a pair of wheels 212 to facilitate transportation, a control unit 214, a conduit 218, and a fan unit 216. The control unit 214 will be described in additional detail with reference to FIG. 2C.

The base 210 can include a number of different internal electronic components, such as batteries, processors, servers, or in some implementations, the control unit 214. In some implementations, the fan 216 is provided in, on, or generally proximate to the base 210. The fan 216 is operable to provide cool air to prevent the electronic or hardware components from overheating. In some implementations which have a wired connection between the control unit 214 and various components of the device 200, one or more portions of the conduit 218 provides an electrical connection between the control unit 214 (which may also be a reserve power battery, in an implementation) and the electronics within the base 210. Further, as illustrated in FIG. 2A, one or more portions of the conduit 218 may also be electrically coupled to the fan 216 via a wired connection. In other implementations, the device 200 may further include a compressor or a fan that is fluidly communicably coupled to the housing 202 in order to provide a pressure differential to the housing 202, as described in additional detail with reference to FIG. 7.

FIG. 2B illustrates the device 200 in a second position corresponding to an active or deployed configuration. The housing 202 is coupled to the support 206, wherein the support 206 includes a plurality of telescoping portions 220 that, upon activation, extend to raise the device 200 from the first position to the second position shown in FIG. 2B. As shown in FIG. 2A, in the first position, the telescoping portions 220 hollow with successive telescoping portions 220 having a slightly smaller outermost dimension such that the telescoping portions are nested within one another to reduce an overall height of the device 200 for transportation. Extension of the telescoping portions 220 is driven by a second actuator or motor 201 within the base 210. The second actuator or motor 201 is preferably electric, such that the actuator or motor can be driven by an external power supply (or batteries within the base 210), but the motor can also be a gas-powered motor in certain implementations.

In an implementation, the second actuator or motor 201 is a hydraulic actuator mechanically coupled to an upper one of the plurality of telescoping portions 220, such that when activated, the second actuator or motor extends the upper one of the plurality of telescoping portions 220 from the first position to the second position. Each of the telescoping portions 220 may further include a flange or tab located at the bottom thereof than can translate along an adjacent telescoping portion 220 without allowing the telescoping portions 220 to become uncoupled such that as the upper one of the telescoping portions 220 reaches the extended configuration, the flange or tab beings to raise the next lower telescoping portion 220, which process continues until the telescoping portions 220 are in the second position. In an alternative implementation, each of the telescoping portions 220 may include rollers located internal to the telescoping portions 220 that are wired to the motor 201 such that when the motor 201 is activated, the rollers raise the telescoping portions from the first position to the second position. In such an implementation, the telescoping portions 220 preferably include a blocking mechanism, such as the flanges or tabs discussed above, to prevent the telescoping portions 220 from uncoupling with each other.

FIG. 2B further illustrates that when the device 200 is in the second position, the plurality of tubes 204 are extended from the housing 202 to an active position or configuration, such as that illustrated in FIGS. 1A-C. Movement of the tubes 204 can be supported by at least a first actuator located internally (not shown due to internal location, but similar to actuator 101 in FIGS. 1A-C) to the housing 202, wherein the at least one first actuator controls movement of all of the tubes 204, or more preferably, the housing 202 includes a plurality of actuators, wherein each actuator is responsible for controlling at least one tube 204 (or a group of tubes 204). For example, in some implementations, the actuators for each tube 204 can be integrated in a sensor enclosure, such as sensor enclosure 116 or other housing of the tube 204. Power for the actuator can be supplied through the support 206 via an external power supply, or batteries in the base 210.

The at least one first actuator may be a linear actuator located internal to the housing 204 that translates between a first outermost position corresponding to the first position of the tubes 204 and a second outermost position corresponding to the second position of the tubes. The linear actuator may be coupled to the tubes 204 at a second opening thereof (such as second opening 110 illustrated in FIGS. 1A-C), such that the linear actuator can manipulate the position of the tubes 204. In other words, when the tubes are in the first position illustrated in FIG. 2A, the actuator is in the first outermost position. When the actuator receives a signal from the control unit 214, the actuator extends towards the second outermost position, thus extending the tubes 204 to the second position illustrated in FIG. 2B. The at least one first actuator may also be hydraulic, or may be a small electric motor coupled to rollers coupled to the housing 202 to move the tubes 204, such as with the second actuator described above.

Figure 2C:
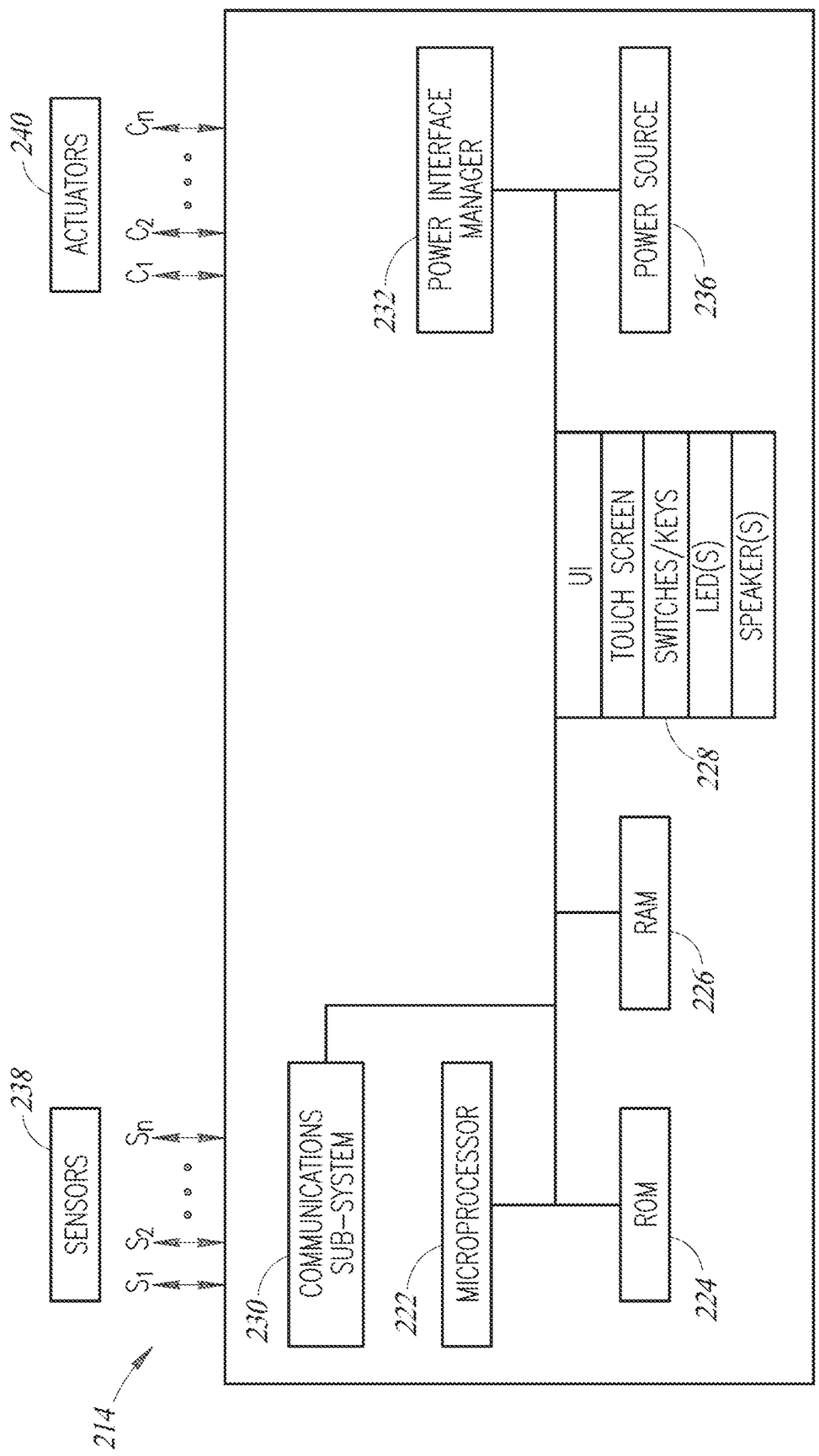
FIG. 2C is a schematic representation of an exemplary implementation of the control system of FIGS. 2A-B.

FIG. 2C is a schematic representation of a control unit 214, which may be located on the trailer 208, in the base 210, in the support 206, or external to the device 200, in various implementations. The control unit 214 is communicably coupled to the sensors and the light devices described herein with reference to FIGS. 3A-B wirelessly or via a wired coupling. In other words, the control unit 214 is in electronic communication with the threat identification devices and systems described herein. Thus, in operation, one or more sensors can detect a target, for example, a muzzle sound, a bird, or other targets, and output a first signal(s) to the control unit 214 identifying one or more of various parameters, such as, for example, distance, location, strength of signal, etc. In some implementations, the control unit 214, in response, can output a second signal(s) to activate an illumination device or other warning device, as described herein. In some implementations, in lieu of, or in addition to the illumination device, the threat identification device 200 can include camera(s), audio transducer(s), graphic user interface(s), or any other suitable device or system to identify the target to the user. Again, in some implementations, the camera(s), audio transducer(s), graphic user interface(s), etc. can be communicably coupled to the control unit 214.

For example, when a sound signature associated with a gunshot is registered by the sensors, the sensors transmit a signal to the control unit 214, wherein the control unit 214 triangulates the position of the gunshot based on geometry. Because there are a plurality of tubes and sensors, two tubes or sensors located proximate to each other with respect to the housing 202 will sense the same gunshot. The angular orientation of the two tubes, as well as the linear distance between them, is known and is transmitted to the control unit 214. Then, the control unit 214 uses these inputs and basic geometry to calculate the location of, and the distance to, the unknown point as a triangle. These calculations can be repeated for other sensors and tubes that detect the gunshot to correct for errors.

The control unit 214 includes a controller 222, for example a microprocessor, digital signal processor, programmable gate array (PGA) or application specific integrated circuit (ASIC). The control unit 214 includes one or more non-transitory storage mediums, for example read only memory (ROM) 224, random access memory (RAM) 226, Flash memory (not shown), or other physical computer- or processor-readable storage media. The non-transitory storage mediums may store instructions and/or data used by the controller 222, for example an operating system (OS) and/or applications. The instructions as executed by the controller 222 may execute logic to perform the functionality of the various implementations of the devices and systems described herein, including, but not limited to, receiving signals from the sensors, and determining, based on the signals, a type of threat, its location, and its range as well as outputting various other control signals to activate countermeasure systems to protect against the threat.

The control unit 214 may include one or more sensors 238 positioned, configured and operable to sense various operation characteristics of the various elements or components of the threat identification systems. For example, the one or more sensors 238 can include one or more sensors described herein that are positioned in the tubes. The one or more sensor(s) 238 are communicatively coupled via one or more internal sensor ports to provide signals represented as $S_1 \ldots S_N$ indicative of such to the controller 222, such as a microprocessor. For example, a sensor can provide a signal to the controller 222 indicative of a type of threat, its location, and its range as well as outputting various other control signals to activate countermeasure systems to protect against the threat.

In addition, the control unit 214 may include and/or be communicatively coupled to one or more actuators 240, which may include fans, motors, lasers, strobe lights, auditory transducers, etc. For example, an actuator may include a motor that controls extension of the support 206 and the tubes 204. For example, the actuator may also include a fan, as described below with reference to FIG. 7. In yet a further example, the actuator may also include the plurality of lasers or the plurality of illumination devices described below with reference to FIGS. 3A-B. Moreover, the actuator may include auditory transducers to provide broadcasting via auditory transducers. The controller 212, optionally in conjunction with any integral controllers of the various components of the threat identification device, typically, based on sensed conditions and programmed logic, provides control signals $C_1$-$C_N$ to actuators 240 of the threat identification system. Moreover, the controller 222 may include instructions corresponding to specific positions (i.e. the first position and the second position discussed with reference to FIGS. 2A-B), which are transmitted to the actuators responsible for moving the support 206 and the tubes 204.

The control unit 214 may include a user interface 228, to allow an end user to operate or otherwise provide input to the device 200, or systems described herein, regarding the operational state or condition of the device 200. The user interface 228 may include a number of user actuatable controls accessible from the device 200. For example, the user interface 228 may include a number of switches or keys operable to turn the device 200 ON and OFF and/or to set various operating parameters of the device 200, such as sensor sensitivity, operation and control of a start-up or test mode, and control of the actuators for moving the support 206 and the tubes 204, among others.

Additionally, or alternatively, the user interface 228 may include a display, for instance a touch panel display. The touch panel display (e.g., LCD with touch sensitive overlay) may provide both an input and an output interface for the end user. The touch panel display may present a graphical user interface, with various user selectable icons, menus, check boxes, dialog boxes, and other components and elements selectable by the end user to set operational states or conditions of the device 200. The user interface 228 may also include one or more auditory transducers, for example one or more speakers and/or microphones. Such may allow audible alert notifications or signals to be provided to an end user manually. Such may additionally, or alternatively, allow an end user to provide audible commands or instructions. The user interface 228 may include additional components and/or different components than those illustrated or described, and/or may omit some components.

The switches and keys or the graphical user interface may, for example, include toggle switches, a keypad or keyboard, rocker switches, trackball, joystick or thumbstick. The switches and keys or the graphical user interface may, for example, allow an end user to turn ON the device 200, start or end a test mode, communicably couple or decouple to remote accessories and programs, access, transmit, or process data, activate or deactivate motors, actuators, or audio subsystems, etc.

The control unit 214 includes a communications sub-system 230 that may include one or more communications modules or components which facilitate communications with various components of one or more external device, such as a personal computer or processor, etc. The communications sub-system 230 may provide wireless or wired communications to the one or more external device, including various actuators described herein. The communications sub-system 230 may include wireless receivers, wireless transmitters or wireless transceivers to provide wireless signal paths to the various remote components or systems of the one or more paired devices. The communications sub-system 230 may, for example, include components enabling short range (e.g., via Bluetooth, near field communication (NFC), or radio frequency identification (RFID) components and protocols) or longer range wireless communications (e.g., over a wireless LAN, Low-Power-Wide-Area Network (LPWAN), satellite, or cellular network) and may include one or more modems or one or more Ethernet or other types of communications cards or components for doing so. The communications sub-system 230 may include one or more bridges or routers suitable to handle network traffic including switched packet type communications protocols (TCP/IP), Ethernet or other networking protocols.

The control unit 214 includes a power interface manager 232 that manages supply of power from a power source 236 to the various components of the control unit 214 and the device 200, for example, when the control unit 214 integrated in, or attached to the device 200. The power interface manager 232 is coupled to the controller 222 and the power source 236. Alternatively, in some implementations, the power interface manager 232 can be integrated in the controller 222. The power source may include external power supply, battery power supply, or others. The power interface manager 232 may include power converters, rectifiers, buses, gates, circuitry, etc. In particular, the power interface manager 232 can control, limit, restrict the supply of power from the power source based on the various operational states of the device 200.

In some embodiments or implementations, the instructions and/or data stored on the non-transitory storage mediums that may be used by the controller, such as, for example, ROM 224, RAM 226 and Flash memory (not shown), includes or provides an application program interface ("API") that provides programmatic access to one or more functions of the control unit 214. For example, such an API may provide a programmatic interface to control one or more operational characteristics of the device 200, including, but not limited to, one or more functions of the user interface 228, or processing the data received from the sensors. Such control may be invoked by one of the other programs, other remote device or system (not shown), or some other module. In this manner, the API may facilitate the development of third-party software, such as various different user interfaces and control systems for other devices, plug-ins, and adapters, and the like to facilitate interactivity and customization of the operation and devices within the device 200.

In an example embodiment or implementation, components or modules of the control unit 214 and other devices within the device 200 and systems described herein are implemented using standard programming techniques. For example, the logic to perform the functionality of the various embodiments or implementations described herein may be implemented as a "native" executable running on the controller, e.g., microprocessor 222, along with one or more static or dynamic libraries. In other embodiments, various functions of the control unit 214 may be implemented as instructions processed by a virtual machine that executes as one or more programs whose instructions are stored on ROM 224 and/or RAM 226. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the control unit 214, such as microprocessor 222, to perform the functions of the control unit 214. The instructions cause the microprocessor 222 or some other processor, such as an I/O controller/processor, to process and act on information received from one or more sensors, lights, lazers, diversion shields, etc. (collectively referenced as 234) to provide the functionality and operations of identifying, locating, and providing defensive countermeasures to a threat.

The embodiments or implementations described above may also use well-known or other synchronous or asynchronous client-server computing techniques. However, the various components may be implemented using more monolithic programming techniques as well, for example, as an executable running on a single microprocessor, or alternatively decomposed using a variety of structuring techniques known in the art, including but not limited to, multiprogramming, multithreading, client-server, or peer-to-peer (e.g., Bluetooth®, NFC or RFID wireless technology, mesh networks, etc., providing a communication channel between the devices within the device 200), running on one or more computer systems each having one or more central processing units (CPUs) or other processors. Some embodiments may execute concurrently and asynchronously, and communicate using message passing techniques. Also, other functions could be implemented and/or performed by each component/module, and in different orders, and by different components/modules, yet still achieve the functions of the control unit 214.

In addition, programming interfaces to the data stored on and functionality provided by the control unit 214, can be available by standard mechanisms such as through C, C++, C#, and Java APIs; libraries for accessing files, databases, or other data repositories; scripting languages; or Web servers, FTP servers, or other types of servers providing access to stored data. The data stored and utilized by the control unit 214 and overall threat identification devices and systems may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules within the device 200 in different ways, yet still achieve the functions of the control unit 214 and the threat identification device 200.

Furthermore, in some embodiments or implementations, some or all of the components of the control unit 214 and components of other devices within the device 200 may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3A:
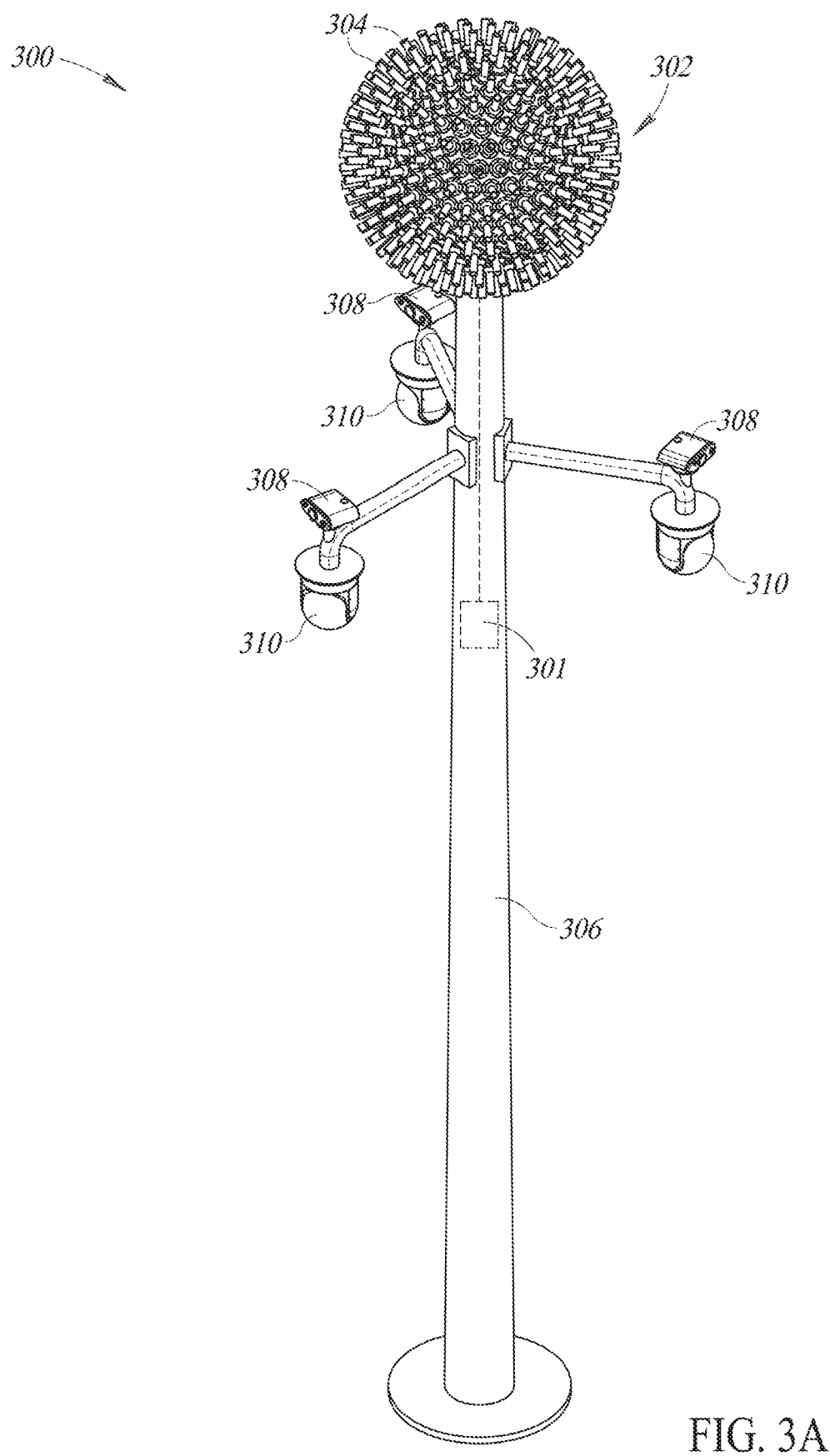
FIG. 3A is a perspective view of an alternative exemplary implementation of a threat identification device including a plurality of lasers and a plurality of illumination devices.
Figure 3B:
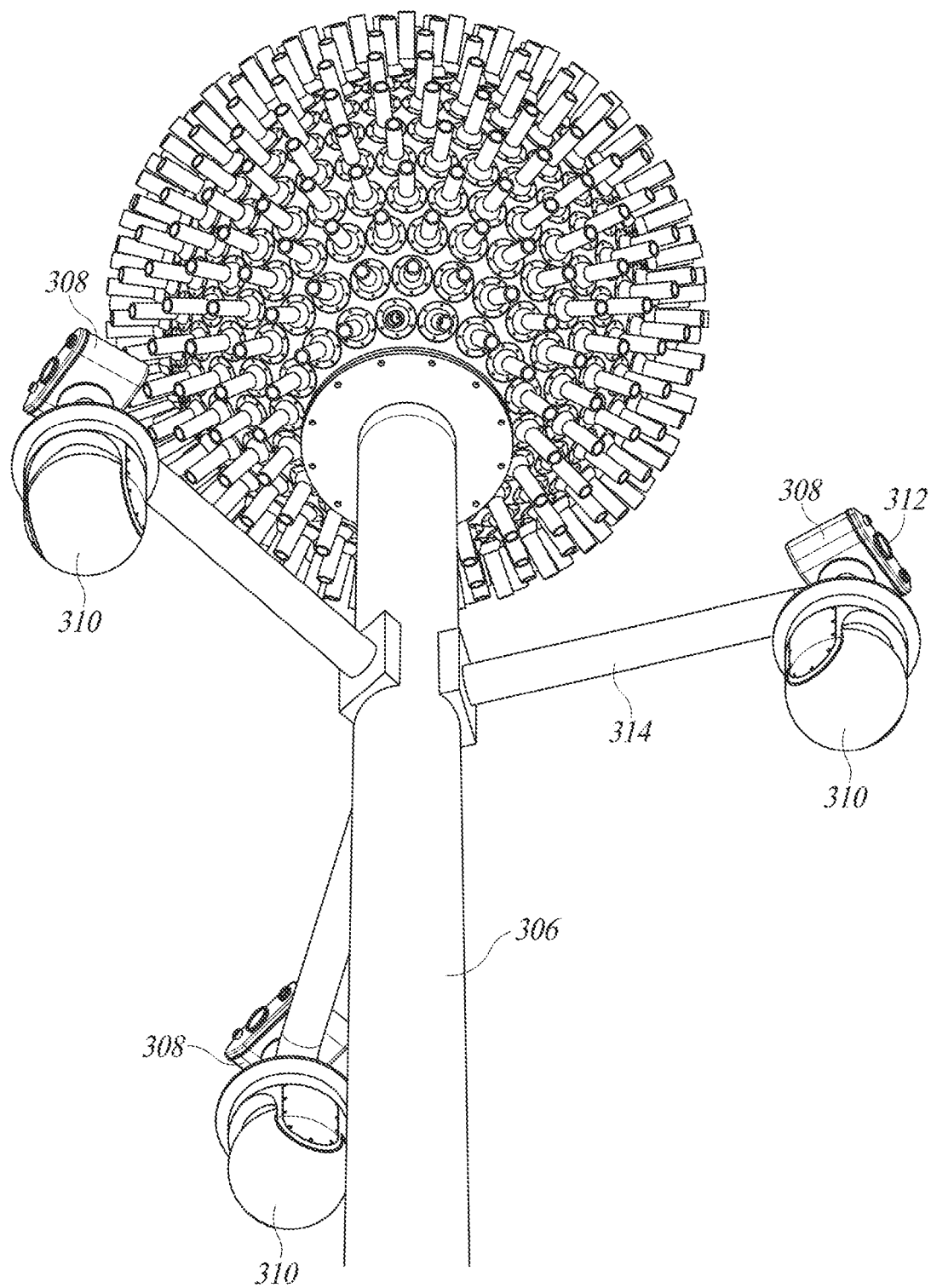
FIG. 3B is a perspective view of the threat identification of the device of FIG. 3A showing the plurality of lasers and the plurality of illumination devices in additional detail.

FIGS. 3A-B are views of an alternative exemplary implementation of a threat identification system 300 which is configured to be permanently mounted in a stadium, concert venue, or other area or building structure. The system 300 includes a housing 302 including a plurality of tubes 304 extending from the housing, as described herein. The housing 302 is coupled to a base 306. Further, the system 300 includes a plurality of laser light sources 308 and a plurality of illumination devices 310, which in an implementation, are strobe lights. While FIG. 3A illustrates the system 300 including three lasers 308 and three illumination devices 310, it is to be appreciated that in other implementations, the system 300 includes more or less than three laser 308 and illumination devices 310, while in other implementations, the system 300 includes only lasers 308 or only illumination devices 310, but not both. Moreover, other accessory components may be coupled to, and controlled by, the system 300, including speakers, microphones, reflectors, refractors, cameras, or additional light sources, for example.

FIG. 3B illustrates the plurality of lasers 308 and the plurality of illumination devices 310 in additional detail. The plurality of lasers 308 include a light aperture 312 and are rotatably coupled to a support 314 coupled to the base 306. In an implementation, rotabably coupled includes rotation in at least two degrees of freedom, such that the laser can turn 360 degrees about a pivot, and adjust an angle of the aperture 312 relative to horizontal. As such, the plurality of lasers 308 can be used to locate threats at various elevations and positions. In other implementations, the plurality of lasers 308 are coupled to the support 314 with a fully articulating joint to enable movement with three degrees of freedom. The plurality of illumination devices 310 are preferably coupled to the support 314 in a similar manner, i.e. with a joint that allows for at rotation in at least two degrees of freedom.

The lasers 308 and the illumination devices 310 are in electronic communication with a control unit 301, which may be substantially similar or identical to the control unit 214 illustrated schematically in FIG. 2C. In general, the lasers 308 and the illumination devices 310 are operably moveable in response to one or more signals received from the control unit 301, wherein movement is controlled by independent actuators located internal to the plurality of lasers 308 and the plurality of illumination devices 310, respectively. The plurality of lasers 308 can be one of any number of types, for example, the lasers 308 can be solid-state lasers, gas lasers, excimer lasers, metal-vapor lasers, chemical lasers, dye lasers, or semiconductor lasers. To the extent that the lasers 308 are characterized by the duration of laser emission, the lasers 308 may also be a continuous wave, singe pulsed, single pulsed q-switched, repetitively pulsed, or mode locked laser, among others.

The illumination devices 310 are, in an implementation a strobe light, wherein the light source can be any of a laser, a light emitting diode ("LED"), an array or panel of LEDs, incandescent lamps, compact fluorescent lamps, halogen lamps, metal halide lamps, fluorescent tubes, neon lamps, low pressure sodium lamps, or high intensity discharge lamps, for example. In other implementations, the illumination devices 310 include a light source that is a conventional LED, an infrared LED, a near-infrared LED, an organic LED (OLED), a laser diode, an infrared laser diode, a near-infrared laser diode, and/or a scanning laser projector, among others, for example. In yet further implementations, the illumination devices 310 are not strobe lights, but rather are additional light sources of any of the above types.

The actuators located internal to the plurality of lasers 308 and the plurality of illumination devices 310 are in electronic communication, either wired or wirelessly, with the control unit 301, such that the control unit 301 can transmit one or more signals to the actuators to move the lasers 308 and the illumination devices 310. As one non-limiting example, in the case of an active shooter in an area where the system 300 is active, in the event the shooter fires a gun shot, such will be detected by the sensors in the tubes 304. The sensors transmit a first signal to the control unit 301, wherein, based on the first signal, the control unit 301 determines a location of the gunshot and transmits a second signal to the actuators controller the plurality of lasers 308 and the plurality of illumination devices 310. The first signal can be used to triangulate the position of the shooter as described above with reference to FIGS. 2A-B. For example, because the angular and linear position of the tubes are known, it allows the control unit 301 to determine the position of the unknown shooter in three dimensional space based on geometry between the known locations.

Then, any number of different responses can be effectuated based on the second signal, including rotating each of the lasers 308 and the illumination devices 310 in the direct of the gunshot to identify, with laser light, the location of the shooter. The illumination devices 310 are activated either to provide a warning to potential victims or as a method of confusing the shooter, as described herein. Alternatively, the control unit 301 may determine which laser 308 and illumination device 310 are in the best position to identify the shooter and direct that laser 308 and illumination device 310 toward the shooter. The other lasers 308 and illumination devices 310 may be directed, based on the second signal, to illuminate safe exit paths in a direction opposite to the determined direction of the gunshot. In yet further implementations, the control unit 301 directs a single laser 308 and a single illumination device 310 towards the shooter to identify the shooter's location, and then directs the remaining lasers 308 and illumination devices 310 towards specific areas to highlight specific areas which spectators should exit (i.e. areas proximate to the shooter).

In other implementations, the plurality of illumination devices 310 are replaced with cameras, or cameras are coupled to the supports 314 and in electronic communication with the control unit 301. The cameras may assist with preventing a perpetrator from escaping a location where an attack is carried out. For example, in an implementation, cameras, in association with face recognition software executed by the control unit 301, will create a unique electronic signature corresponding to unique features of a perpetrator's face and then search for that signature as people exit the event. The search portion of the implementation may also be carried out in conjunction with existing camera systems in place at a public venue. The facial recognition software may, in an example, capture of photo of a face of an individual and extract landmarks, or features of the face, from the image. Such landmarks may include, without limitation, the relative position, size, and/or shape of the eyes, nose, cheekbones, and jaw. Once the landmark features are identified, they are saved in a database with a corresponding unique electronic signature. Then, the cameras will compare newly acquired facial data with the database of known images to determine if there is a match. Alternatively, cameras associated with exits at the venue may perform the match functionality so that a threat perpetrator cannot exit without being identified.

Additionally or alternatively, the threat identification device or system may record the perpetrator's physical mannerisms and characteristics for identification. In particular, as an example, while walking or running, each person uses their own unique stride dips and step lengths, which can be captured to generate a unique movement signature, similar to the facial landmarks described above. As such, once the unique movement signatures are captured and cataloged by the threat identification device or system, searching for a target movement signature may function or operate similar to running a fingerprint through a fingerprint database. Such searching of a movement signature may be advantageous, in that, movement signature is easier to capture and achieve as a baseline contribution in locating a terrorist, either during an attack, or even months or years later. Further, as the threat identification device or system captures and simultaneously catalogs an identified perpetrator's physical mannerisms, any precise repeated movements may help identify the perpetrator upon exiting the area or even after the attack is over and the perpetrator has left the event. For example, if a terrorist is able to escape an event, but subsequently attempts to leave the city of the attack on an airline flight, cameras at an airport could capture images of passenger's movements and compare them to the movement signatures captured from the event to later determine if there is a match.

In addition to, or alternative to the threat identification device or system that includes cameras, internal radar or updated digital radio frequency ("RF") technologies can be included in the threat identification device or system to facially and bodily recognize and paint a precise mapped electronic signature onto a suspect. Such implementations of the threat identification device or system may further assist with rapidly identifying a targeted individual by conducting rapid scene changing imaging comparisons through intelligence detection surveillance software and hybrid cloud integration platforms. For example, the threat identification device or system may include internal deep learning biometric software which is capable of mapping an individual's entire bodily energy field signature (including facial features) mathematically and storing the data to find a short termed escaping match. In some implementations, the threat identification device or system may include conventional radial beamed scanning sensors or synthetic aperture radar frequency imagery to compare one image within an assigned specific zone about the threat identification device or system against a refreshed image at surrounding exit points. Moreover, the threat identification device or system may provide higher refresh rates to assure improvements in image clarity and detail sharpness to work quickly and minimize error readings by capturing, reading, and/or processing data from rapidly changing moving images.

Figure 4:
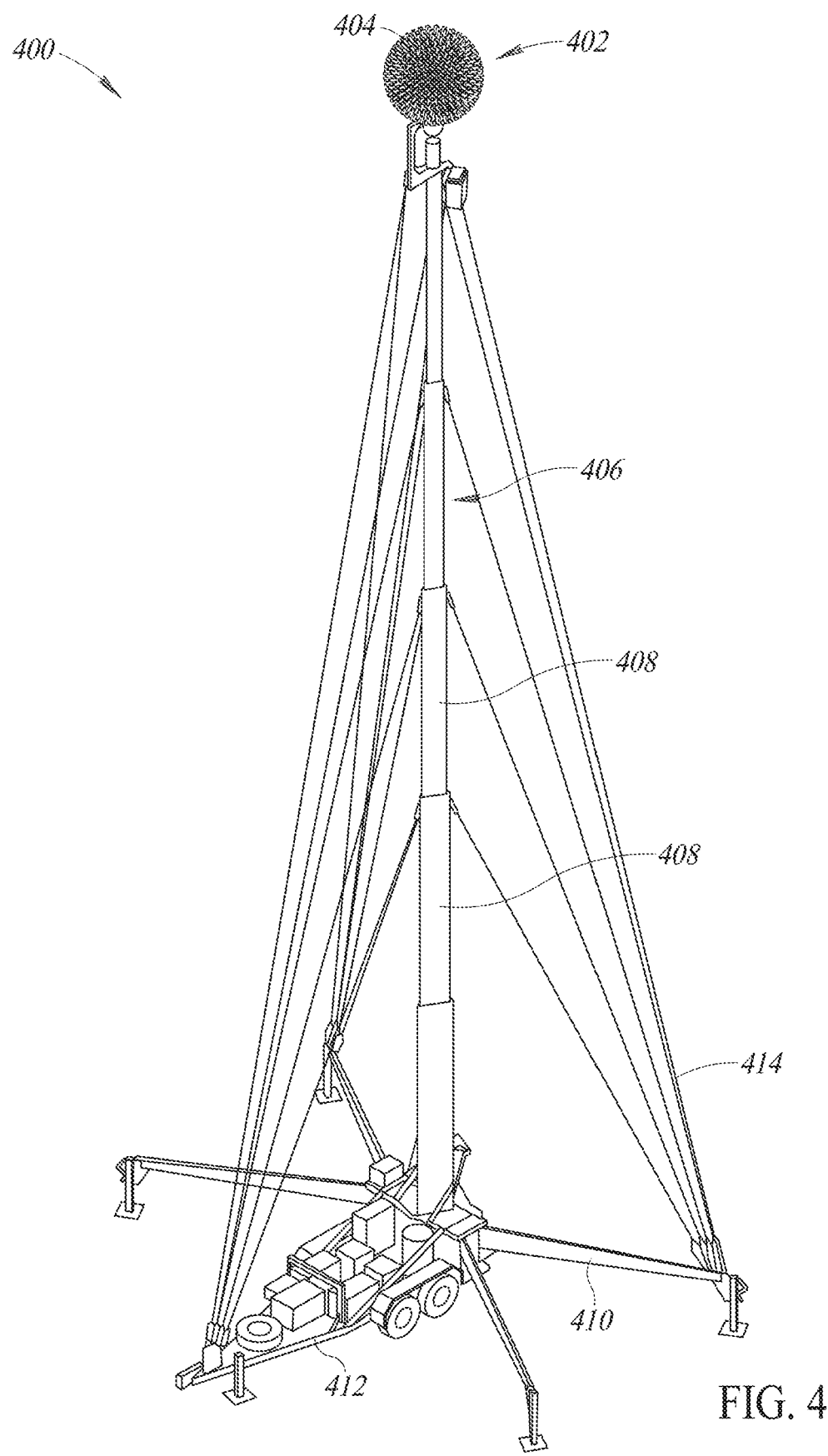
FIG. 4 is a perspective view of an alternative exemplary implementation of a threat identification device coupled to a trailer.

FIG. 4 is an alternative exemplary implementation of a threat identification system 400 including a housing 402 with a plurality of tubes 404 coupled to and extending from the housing 402. The housing 402 is coupled to a base 406 which is mounted on a trailer 412, such that the system 400 is mobile, similar to the system described with reference to FIGS. 2A-B. The base 406 includes a plurality of frame elements 408 that may be assembled on site. Moreover, the trailer 412 and the base 406 are stabilized by a plurality of support arms 410 extending from the trailer 412 in a crossing pattern. A plurality of cables 414 are coupled between the support arms 410 and the base 406 at various points along a height of the base 406 so as to provide further stability through tension in the cables 414. As such, this implementation allows for the system 400 to be deployed at a much higher elevation, such as may be useful for detecting UAVs, or other aerial threats.

Figure 5A:
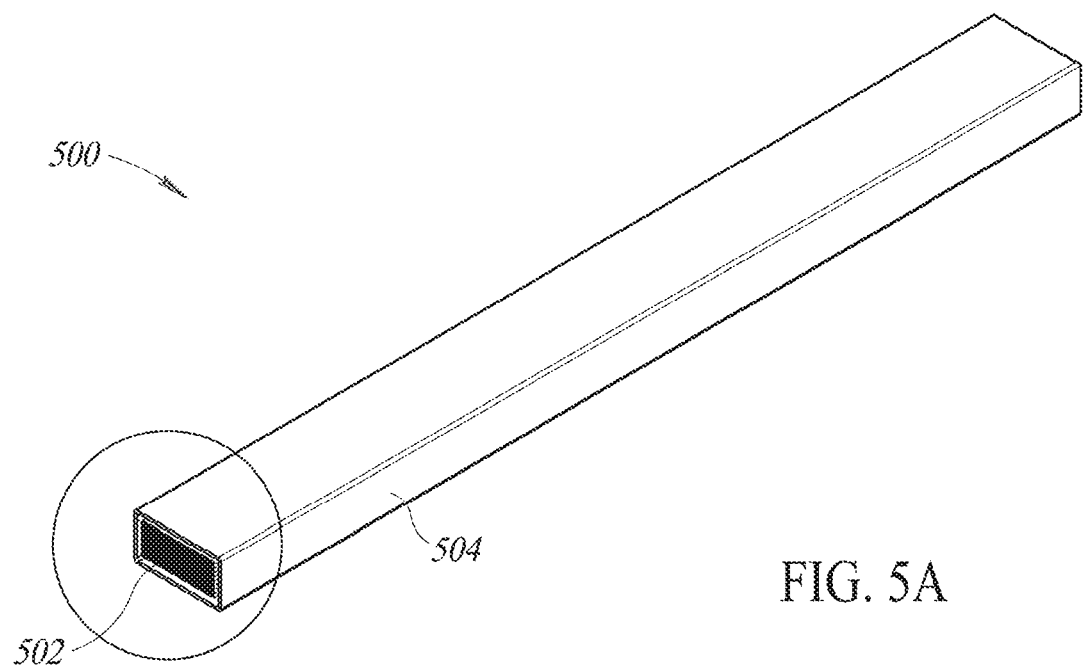
FIG. 5A is a perspective view of an exemplary implementation of a curtain system that is remotely deployable, with the system illustrated in a storage configuration.
Figure 5B:
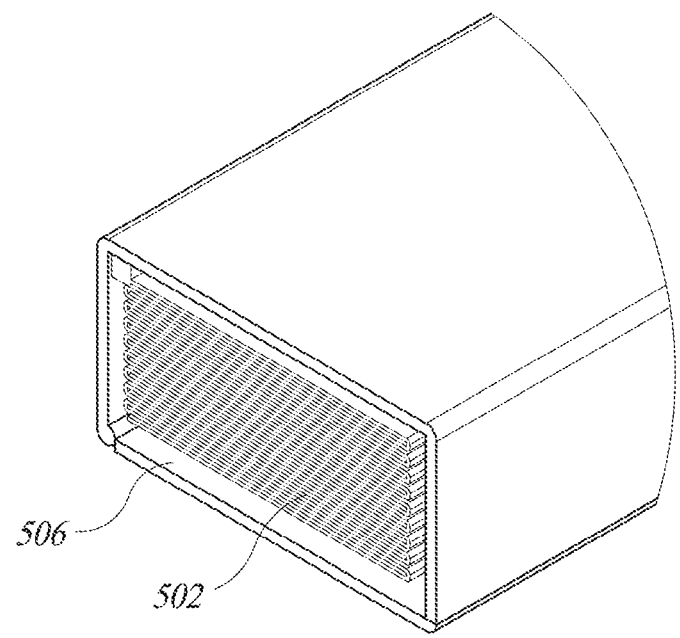
FIG. 5B is a partial perspective view of the curtain system of FIG. 5A showing the storage configuration in additional view.
Figure 5C:
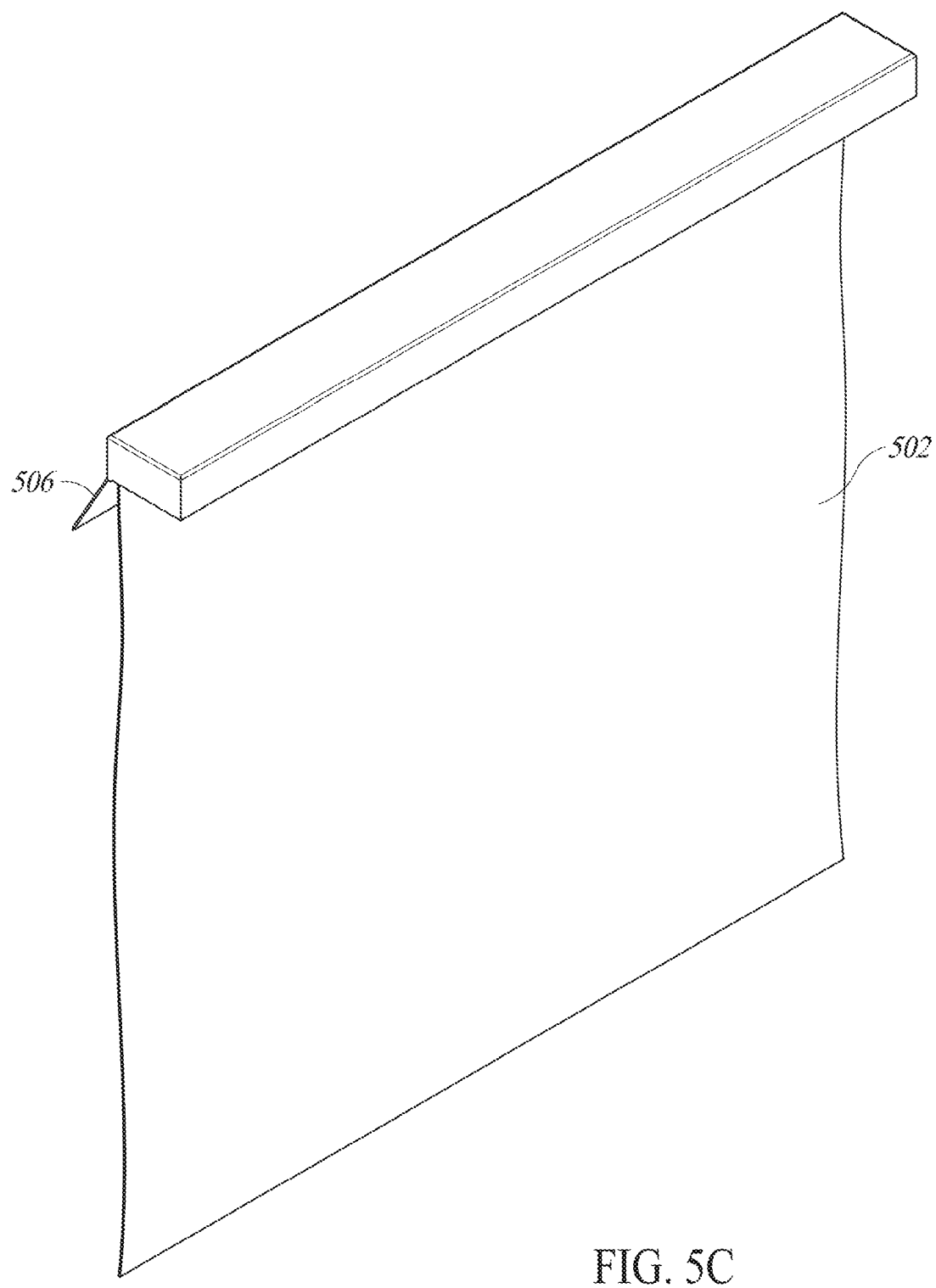
FIG. 5C is a perspective view of the curtain system of FIG. 5A with the system illustrated in a deployed configuration.

FIGS. 5A-C are views of an implementation of an exemplary countermeasure in the form of a curtain system 00. This system 500 may automatically drop a bullet deflection and diversion shield curtain 502 from a housing 504. This shield curtain 502 provides people additional safety solutions from being shot in public spaces. In an implementation, the curtain system 500 is in electronic communication with the control unit 214, wherein individual housings 504 are located through a public area, such as a stadium or a concert venue. When a threat is detected, the control unit 214 sends a signal to the curtain system 500 to deploy the curtain 502. In other words, the device 200 locates where a threat is coming from and sends a signal to the curtain system 500 to deploy the curtains 502, wherein gravity drops the curtains 502 from the housing 504 by releasing a rotatable plate 506 at a bottom of each housing 504. Then, the device 200 announces (either with speakers that are associated with the device 200, or through a central broadcast system that is external to the device 200) and directs people to the fastest calculated defensive positions, including the positions or locations of the shield curtains 502. Additionally or alternatively, the system may provide instructions for how to access the best predetermined escape routes and notify authorities or other predetermined emergency contacts for response solutions.

As such, in this implementation, the shield curtains 502 and the housings 504 are hidden within a ceiling in a property, wherein the curtains 502 are autonomously dropped in response to a detected threat. This system 500 will therefore protect patrons and employees by shielding them from being shot by bullets and by providing people better survival opportunities and time to escape the area. Such as, providing escape route guides that may be a lighted narrow long channels (red to green or similar) mounted onto the ceiling, directing people with a visual aid to an escape exit point. The deflection and diversion shield curtains 502 are preferably a drop-down flexible composite as compared to a bullet proof hardcover barrier, although it is possible to lower a hardcover barrier in a similar manner. Kevlar® type products or carbon-based material ingenuities like Graphene (able to dissipate 10 times the kinetic energy of steel in multilayer of atom sized thicknesses) will displace the entire force of the bullets energy in a short distance. The bullet's radial energy dissipates quickly as the absorption rate transfers into a large deflection field throughout the entire shield curtain 502. Rather than "stopping the bullet", this principal is better explained as "capturing the bullet". As such, when a bullet contacts the shield curtain 502, the projectile's full energy force is transferred to the sheet curtain 502 in order to slowly stop the bullet as its energy dissipates outward through the curtain 502. As such, the shield curtain 502 lets the bullet's energy transfer past the initial point of contact, wherein the bullet is slowed until it is stopped within the shield curtain's 502 grasp. The more flexibility the shield curtain has, the lower the damage levels the shield curtain sustains.

The drop-down shield curtain 502 may extend to the floor or in other implementations, above the floor, depending on the presets and where the shooter is shooting from relative to shielding the patrons. The shield curtain 502 also has varying spacing areas and connection straps above where connected to the ceiling storage cartridges. The lightweight mesh capture netting will absorb the bullets energy over a larger area verses a ridged system that carries the narrow focal force energy point as the bullet transfers past the impact focal point. Other bulletproof barriers are heavy and ridged where the bullet force is centralized into a rigid stopping point structure absorbing all of the force in one small area, creating torque, weight, and energy recoil effect. In contrast, a rigid bulletproof barrier becomes less effective as more bullets hit the barrier, creating expanding damaged areas within the material.

The shield curtain 502 may be reused again and again by repacking the entire shield curtain 502 back into the housing 504 and resetting the system's armed functions through the control unit 214. Additionally, the drop distance or length of the curtain 502 can be adjusted so as to allow for gaps under the curtain 502 by which potential victims can escape. FIGS. 5A-B illustrates the shield curtain 502 packed within the housing 504 and held in place by the plate 506, which corresponds to a first or storage position. As noted above, the housing 504 is preferably hidden within a ceiling, so that the location is unknown to a potential shooter. Then, the system 500 receives a signal from the control unit 214 to deploy the curtain 502, at which point the plate 506 rotates to an open position, and gravity causes the curtain 502 to fall towards the ground, as in FIG. 5C. Moreover, although the curtain 502 is illustrated as a flat and planar sheet, it is to be appreciated that the scope of the present disclosure also includes the curtain 502 having side sheets as well so as to form a more complete enclosure to protect against gunshots from various side angles.

In a further implementation, the curtain system 500 is integrated with a threat identification system, such as threat identification system 300 described above in FIGS. 3A-B. For example, the curtain housing 504 can be integrated into supports 314 extending from the base 306, shown in FIG. 3B. In such an implementation, the threat identification system 300, including the curtain system 500, could be located at various points throughout an open air concert venue, in one non-limiting example. Upon detection of a threat, the curtain system 500 could release the curtain 502, as described above, such that spectators at the concert could gain cover behind the curtain 502 while the threat is neutralized as an additional defensive countermeasure to those described above.

Figure 6A:
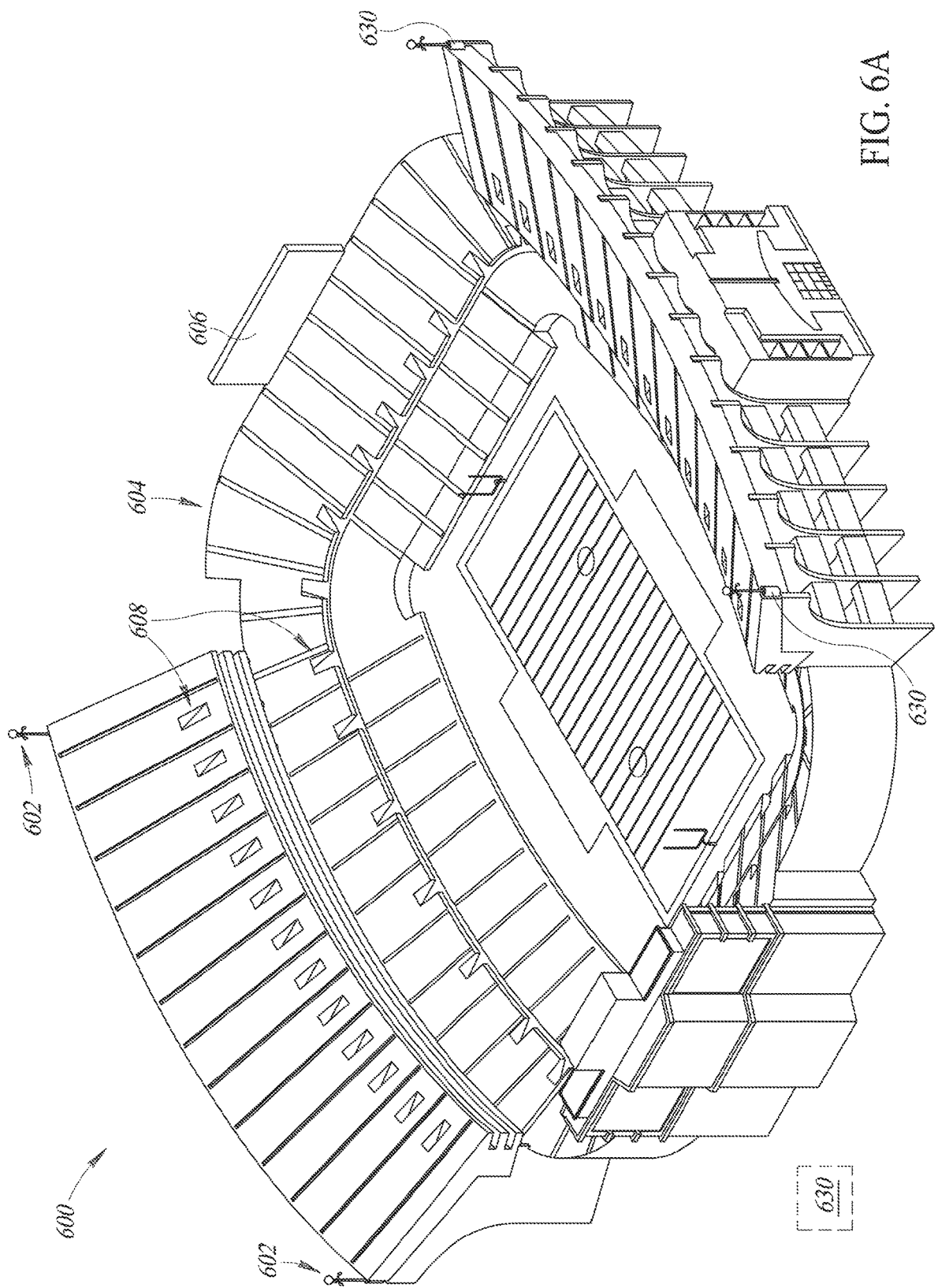
FIG. 6A is a perspective view of an exemplary implementation of a threat identification system including a plurality of threat identification devices located in a stadium.

FIG. 6A is a view of an implementation of a threat identification system 600 installed in a stadium 604. This implementation is not limited to stadiums, but could also be used in businesses, schools, shopping malls, outdoor gathering places, public places or markets, or any other space where threat detection is desired. The system 600 includes a plurality of threat identification devices 602 located around the stadium 604. Each threat identification device 602 may be substantially similar to the threat identification system 300 described with reference to FIGS. 3A-B above. As such, sensors of each threat identification device 402 detect an external condition, such as a gunshot, for example, and transmit a signal to control units 630 associated with each threat identification device 602. Alternatively, the threat identification devices 602 may transmit the signals to a remote control unit 630 located external to the devices 602 in an area that is safe from interference by a prospective terrorist.

Once the threat is detected, the control unit 630 receives a signal corresponding to the threat and determines its location based on the tubes (not shown due to scale, but similar to tubes 614 in FIG. 6B) that detected the threat. Then, the control unit provides a signal to illumination devices, such as lasers 308 and illumination devices 310 in FIGS. 3A-B, to illuminate the threat. Additionally, the illumination devices can illuminate exits 608 that are safe and away from the threat. In addition, the control unit may be in electronic communication with a video panel 606 in the stadium to display instructions to those in the stadium in order to provide a defensive countermeasure. Instructions may include which colors of light to follow to an exit 608, along with locations of shield curtains, such as shield curtains 502, for example. In addition, in certain implementations, the control unit may be in electronic communication with a central audio system of the stadium 604, wherein instructions can be broadcast over speakers to all people at the stadium 604 in response to a detected threat.

Figure 6B:
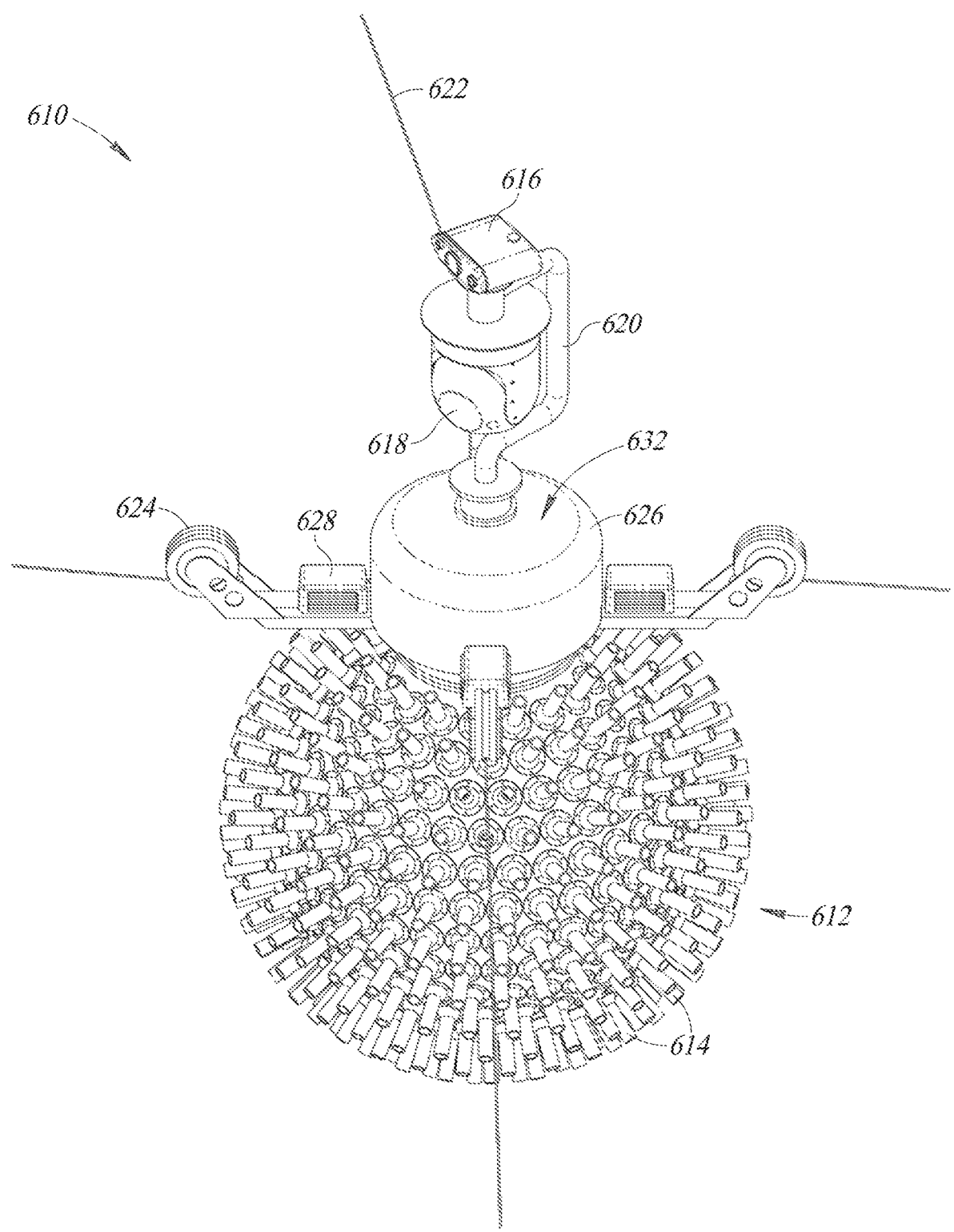
FIG. 6B is a perspective view of one of the plurality of threat identification devices of FIG. 6A aerially mounted within the stadium with a plurality of cables so as to be moveable over the stadium.

FIG. 6B illustrates an exemplary implementation of a "skycam" type threat identification device 610. The threat identification device 610 is designed as a mobile system aerially suspended over the stadium 604 by a plurality of cables 622, which may be attached to the plurality of threat identification devices 604 in FIG. 6A, for example. Alternatively, the plurality of cables 622 may be attached to other support structures in the stadium, such as other support poles (not shown) around the top of the stadium 604 or the video panel 606.

The threat identification device 610 includes a housing 612 and a plurality of tubes 614 as well as at least one laser 616 and at least one illumination device 618. These features may be substantially similar to the implementations described above with reference to FIGS. 1A-3B and as such, description of implementations of these features and their corresponding functionality will not be repeated in detail. Moreover, the laser 616 and the illumination device 618 are supported by a support arm 620, which extends from a top 632 of the housing 612. The support arm 620 has a generally "C" shape with rounded corners and straight members between the corners. The support arm 620 is designed to enable free rotation of the laser 616 and the illumination device 618, as described herein with reference to FIGS. 3A-3B.

The threat identification device 610 further includes a plurality of rollers 624 and a plurality of actuators 628. Further, the device 610 includes a control unit 626, which may be substantially similar to control unit 214. The plurality of tubes 614 include sensors which transmit signals to the control unit 626 to control functionality of the device 610. For example, in an implementation, the sensors detect an external condition, which prompts the control unit 626 to send a signal to the actuators 628 to rotate the wheels 624 to move the device 610. Because the device 610 is supported by cables 622 on all sides, the device 610 can move to be positioned over any point of the stadium 604. Thus, the device 610 provides for a mobile solution capable of detecting any number of threats within the stadium. The device 610 can be used as a standalone system, similar to the independent systems described herein, or can be used as part of a larger system, such as system 600, in order to provide a mobile threat identification component within the larger system 600.

Figure 7:
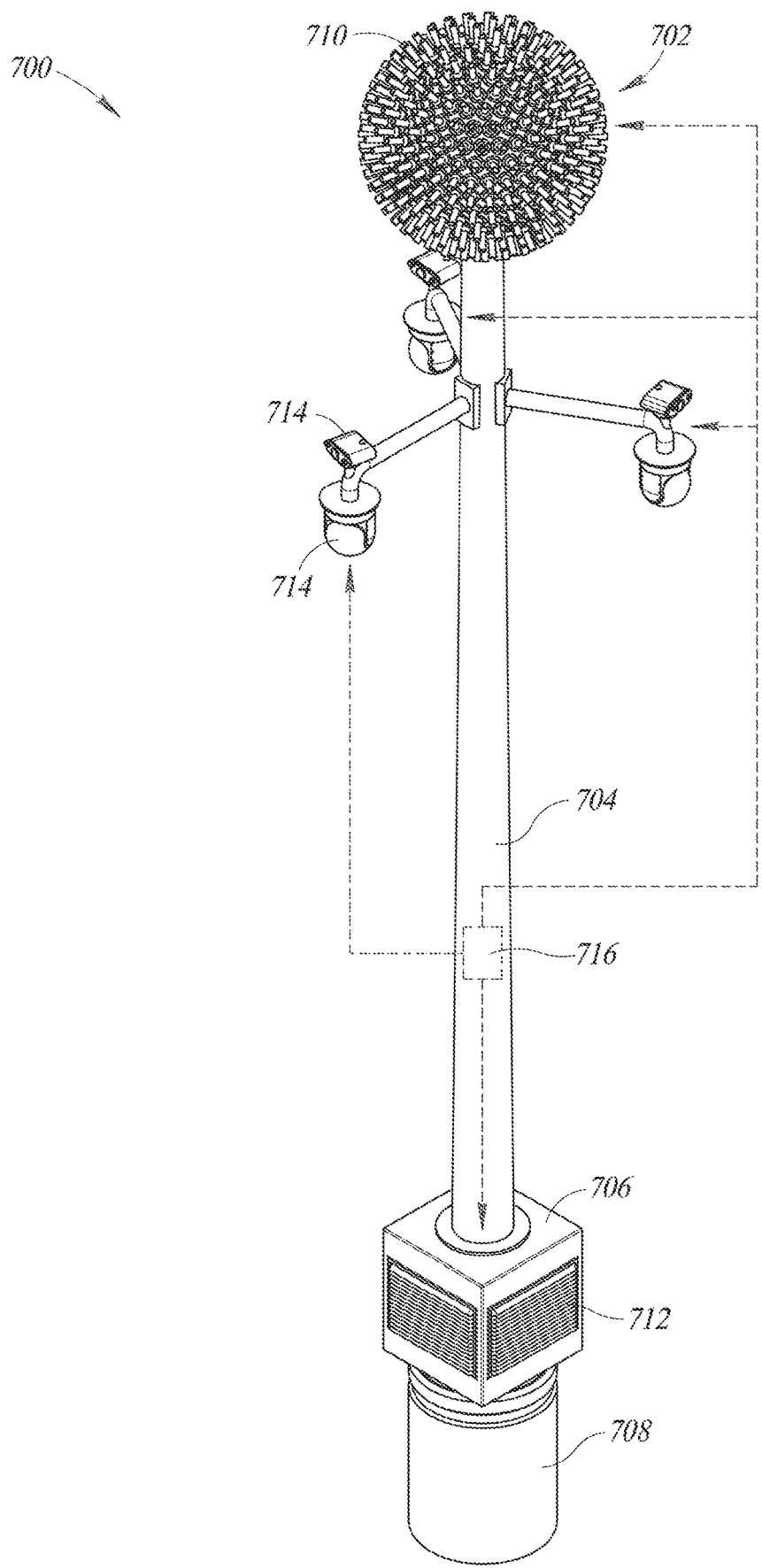
FIG. 7 is a perspective view of an alternative exemplary implementation of a threat identification device for detecting an airborne threat with a fan for creating a negative pressure differential within a housing so as to draw air into tubes extending from the housing.

FIG. 7 is a perspective view of yet a further alternative implementation of a threat identification device 700. The threat identification device 700 can include all of the features and functionality described above with reference to the devices and systems in FIGS. 1A-6B and as such, description of such features will not be repeated. However, this implementation is particularly directed to sensing and responding to airborne pathogen threats and includes a housing 702 coupled to a base 704, which is in turn, coupled to an exhaust system or fan 706 as well as a reservoir 708. In this implementation, the fan 706 provides a negative pressure differential relative to outside air within the housing 702 through the base 704, which is hollow and in fluid communication with the fan 706. As such, air is drawn in through a plurality of sensing tubes 710 extending from the housing 702. The air then travels through the housing 702, down the base 704, to be exhausted at the vents 712.

The device 700 further includes a control unit 716 internal to the device 700, or located external to the device 700, which may be similar to the control unit 214, and is in electronic communication with sensors in the plurality of tubes, as well as the fan 706 and the reservoir 708. When air containing a pathogen or toxin is introduced into the tubes 710, sensors in the tubes 710 detect the toxin and transmit a signal to the control unit 716. Alternatively, at least one of the vents 712 may not be in fluid connection with the fan 706, but rather, may include a sensor associated with the vent 712, such that toxins that are heavier than air can be detected and a corresponding signal can be transmitted to the control unit 716. In yet other implementations, the direction of air flow in the fan 706 can be reversed, such that air is drawn in through the vents 712, wherein sensors proximate the vents can detect toxins near the ground. Reversal of airflow may be carried out periodically or intermittently as part of the normal sensing activity of the device 700, thus enabling detection of additional types of toxins.

The control unit 716 then processes the signal to determine the type of pathogen and the direction it is spreading according to the triangulation principles discussed herein, and sends a signal to the reservoir 708, which contains a plurality of neutralizing agents corresponding to various common toxins. The control unit 716 further transmits a signal to the fan 706 to reduce the direction of operation, wherein the fan 706 draws in air through the vents 712. At this point, the control unit 716 transmits a signal to the reservoir 708 to release a neutralizing agent corresponding to the toxin, which combines with the positive air differential generated by the fan 706 to be transported through the base 704 and out of the tubes 710 in a direction that corresponds to the direction of introduction of the toxin. In yet other implementations, the device 700 does not include the reservoir 708, but rather, the housing 708 houses the control unit 716 or other electronic components, such as a battery, in one non-limiting example. In these implementations, the device 700 is configured to detect the presence and location of an airborne threat, with countermeasures including using light sources 714 to identify the threat and provide routes for escape away from the spread of the airborne toxin, as described herein.

It is to be further appreciated that implementations of the present disclosure include various methods for detecting and locating a threat and providing defensive countermeasures. With reference to FIGS. 1A-7, in an exemplary implementation of a method according to the present disclosure, the method begins by activating a threat identification system. Optionally, a start-up or test mode may then be initiated wherein light is emitted from the tubes in order to test the sensing area. Based on this test information, position of the tubes may be adjusted in order to ensure adequate coverage and overlap. Then, once the system is active and testing is complete, the system continuously scans, via the sensors, for an external condition, which may any of the threats described herein. When an external condition is detected by at least one of the sensors, the sensors that detected the threat transmit a first signal corresponding to the detected external condition to a controller or control unit. Then, the controller processes the first signal, wherein processing includes triangulating a direction, range, or position of the external condition. Once these calculations are complete, the control unit transmits a signal corresponding to the direction information to any of a number of different components of the system.

For example, the second signal can be transmitted to the lasers or lighting devices which rotate to identify the location of the external condition, as well as rotate to highlight preferred escape routes and to provide flashing lights to confuse the terrorist. In addition, the second signal can be sent to video panels or a central broadcast system to provide instructions for defensive postures. Additionally or alternatively, the second signal can be sent to curtain systems to deploy shield curtains, as described with reference to FIGS. 5A-C. Still further, the second signal can be transmitted to a wearable or carriable electronic device, such as a smart phone or a smart watch, to provide warnings to potential victims corresponding to the threats in the form of visual, auditory, or tactile warnings. In addition, the control unit can contact designated authorities or security personal regarding the threat, its location, range, and movement within the system, as described above with reference to tracking terrorists once a threat is identified. It is to be further appreciated that this is just one non-limiting, exemplary implementation, and that other methods associated with the features provided above are contemplated within the scope of the present disclosure.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied outside of the threat identification context, and not necessarily the exemplary threat identification systems, methods, and devices generally described above.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and/or perform acts in a different order than as illustrated or described.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the implementations can be modified, if necessary to employ concepts of the various patents, applications and publications to provide yet further implementations.

U.S. Provisional Patent Application No. 62/614,796, filed Jan. 8, 2018, to which the present application claims priority, is hereby incorporated herein by reference in its entirety.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A threat identification device comprising:
 a housing;
 a plurality of tubes coupled to the housing and translatable between a first position and a second position;
 a first actuator coupled to the housing and to the plurality of tubes;
 a plurality of sensors, each sensor coupled to at least a corresponding one of the plurality of tubes; and
 a controller in electronic communication with the first actuator and the plurality of sensors, wherein during operation, the controller provides a first signal to the first actuator to translate the plurality of tubes between the first position and the second position and the controller receives a second signal from at least one of the plurality of sensors in response to an external condition detected by the at least one of the plurality of sensors.

2. The threat identification device of claim 1 further comprising:
 a plurality of optic lasers coupled to the housing and in electronic communication with the controller, wherein when the controller receives the second signal, the controller outputs a third signal to activate the plurality of optic lasers in response to the external condition.

3. The threat identification device of claim 2 further comprising a plurality of second actuators coupled to corresponding ones of the plurality of optic lasers, wherein the plurality of optic lasers are rotatable about two degrees of freedom and wherein when the controller receives the second signal, the controller outputs a fourth signal to the plurality of second actuators to rotate the plurality of optic lasers in a direction corresponding to the external condition.

4. The threat identification device of claim 1 further comprising:
 a plurality of strobe lights coupled to the housing and in electronic communication with the controller, wherein when the controller receives the second signal, the controller outputs a third signal to activate the plurality of strobe lights in response to the external condition.

5. The threat identification device of claim 4 further comprising a plurality of second actuators coupled to corresponding ones of the plurality of strobe lights, wherein the plurality of strobe lights are rotatable about two degrees of freedom and wherein when the controller receives the second signal, the controller outputs a fourth signal to the plurality of second actuators to rotate the plurality of strobe lights in a direction corresponding to the external condition.

6. The threat identification device of claim 1 further comprising:
 a shield curtain located external to the housing and deployable from a third position to a fourth position, wherein the shield curtain is in electronic communication with the controller and wherein when the controller receives the second signal, the controller outputs a third signal to the shield curtain to deploy the shield curtain from the first position to the second position.

7. The threat identification device of claim 1 further comprising a plurality of light sources located external to the housing and in electronic communication with the controller, wherein when the controller receives the second signal, the controller outputs a third signal to at least one of the plurality of light sources to activate the at least one of the plurality of light sources in response to the external condition.

8. The threat identification device of claim 1 wherein when the controller receives the second signal, the controller outputs a third signal corresponding to an alert to a personal electronic device.

9. A threat identification device, comprising:
 a base;
 a housing coupled to and extending from the base;
 a plurality of tubes coupled to and extending from the housing;
 a plurality of sensors, each sensor of the plurality of sensors coupled to a corresponding one of the plurality of tubes;
 an actuator; and
 a controller in electronic communication with the plurality of sensors, wherein during operation, in response to an external condition detected by the at least one of the plurality of sensors:
  the controller provides a first signal to the actuator to translate the plurality of tubes between a first position and a second position; and
  at least one of the plurality of sensors provides a first second signal to the controller, and the controller outputs a third signal based on the second signal, the third signal representing location information corresponding to a direction of the external condition.

10. The threat identification device of claim 9 further comprising a trailer, wherein the base is coupled to the trailer and wherein the base is moveable between a collapsed configuration and an extended configuration.

11. The threat identification device of claim 10 further comprising a plurality of actuators coupled to corresponding ones of the plurality of tubes and in electronic communication with the controller, wherein the plurality of tubes are moveable between the first position and the second position, the second position corresponding to the extended configuration of the base.

12. The threat identification device of claim 9 further comprising:
 a plurality of lasers rotatably coupled to the base and in electronic communication with the controller, wherein the controller outputs the third signal to a first one of the plurality of lasers to rotate the first one of the plurality of lasers in the direction of the external condition.

13. The threat identification device of claim 12 wherein the controller outputs the third signal to a second one of the plurality of lasers to rotate the second one of the plurality of lasers in a direction opposite to the direction of the external condition.

14. The threat identification device of claim 13 further comprising:
 a plurality of strobe lights rotatably coupled to the base and in electronic communication with the controller, wherein the controller outputs the third signal to at least one of the plurality of strobe lights to rotate the at least one of the plurality of strobe lights in the direction of the external condition.

15. The threat identification system of claim 9 further comprising:
 a plurality of shield curtains in electronic communication with the controller, wherein the controller outputs the third signal to the plurality of shield curtains to deploy the plurality of shield curtains from a storage configuration to a deployed configuration.

16. A method, comprising:
 detecting an external condition with at least one of a plurality of sensors coupled to a plurality of tubes extending from a housing coupled to a base, each of the plurality of sensors in electronic communication with a controller;

transmitting a first signal from the controller to an actuator to cause translation of the plurality of tubes between a first position and a second position in response to the external condition;

transmitting a second signal corresponding to the external condition to the controller;

processing the second signal with the controller, the processing including determining direction information corresponding to a direction of the external condition; and outputting third second signal from the controller corresponding to the direction information.

17. The method of claim 16 wherein outputting the third signal from the controller includes outputting the third signal to a plurality of lasers rotatably coupled to the base, at least one of the plurality of lasers rotating to the direction of the external condition based on the third signal.

18. The method of claim 16 wherein outputting the third signal from the controller includes outputting the third signal to a plurality of strobe lights rotatably coupled to the base, at least one of the plurality of strobe lights rotating to the direction of the external condition based on the third signal.

19. The method of claim 16 wherein outputting the third signal from the controller includes transmitting the third signal to a remote electronic device in electronic communication with the controller, the remote electronic device providing a warning indicator based on the third signal.

20. The method of claim 16 wherein outputting the third signal from the controller includes transmitting the third signal to a plurality of shield curtains in electronic communication with the controller to deploy the plurality of shield curtains from a first configuration to a second configuration.

21. A threat identification device, comprising:
a base;
a housing coupled to and extending from the base;
a plurality of tubes coupled to and extending from the housing;
a plurality of sensors, each sensor of the plurality of sensors coupled to a corresponding one of the plurality of tubes;
a trailer, wherein the base is coupled to the trailer and wherein the base is moveable between a collapsed configuration and an extended configuration; and
a controller in electronic communication with the plurality of sensors, wherein during operation, at least one of the plurality of sensors provides a first signal to the controller in response to an external condition detected by the at least one of the plurality of sensors, and the controller outputs a second signal based on the first signal, the second signal representing location information corresponding to a direction of the external condition.

22. A threat identification device, comprising:
a base;
a housing coupled to and extending from the base;
a plurality of tubes coupled to and extending from the housing;
a plurality of sensors, each sensor of the plurality of sensors coupled to a corresponding one of the plurality of tubes;
a controller in electronic communication with the plurality of sensors, wherein during operation, at least one of the plurality of sensors provides a first signal to the controller in response to an external condition detected by the at least one of the plurality of sensors, and the controller outputs a second signal based on the first signal, the second signal representing location information corresponding to a direction of the external condition; and
a plurality of lasers rotatably coupled to the base and in electronic communication with the controller, wherein the controller outputs the second signal to a first one of the plurality of lasers to rotate the first one of the plurality of lasers in the direction of the external condition.

23. A threat identification device, comprising:
a base;
a housing coupled to and extending from the base;
a plurality of tubes coupled to and extending from the housing;
a plurality of sensors, each sensor of the plurality of sensors coupled to a corresponding one of the plurality of tubes;
a controller in electronic communication with the plurality of sensors, wherein during operation, at least one of the plurality of sensors provides a first signal to the controller in response to an external condition detected by the at least one of the plurality of sensors, and the controller outputs a second signal based on the first signal, the second signal representing location information corresponding to a direction of the external condition; and
a plurality of shield curtains in electronic communication with the controller, wherein the controller outputs the second signal to the plurality of shield curtains to deploy the plurality of shield curtains from a storage configuration to a deployed configuration.

24. A method, comprising:
detecting an external condition with at least one of a plurality of sensors coupled to a plurality of tubes extending from a housing coupled to a base, each of the plurality of sensors in electronic communication with a controller;
transmitting a first signal corresponding to the external condition to the controller;
processing the first signal with the controller, the processing including determining direction information corresponding to a direction of the external condition; and
outputting a second signal from the controller corresponding to the direction information, wherein outputting the second signal from the controller includes outputting the second signal to a plurality of lasers rotatably coupled to the base, at least one of the plurality of lasers rotating to the direction of the external condition based on the second signal.

25. A method, comprising:
detecting an external condition with at least one of a plurality of sensors coupled to a plurality of tubes extending from a housing coupled to a base, each of the plurality of sensors in electronic communication with a controller;
transmitting a first signal corresponding to the external condition to the controller;
processing the first signal with the controller, the processing including determining direction information corresponding to a direction of the external condition; and
outputting a second signal from the controller corresponding to the direction information, wherein outputting the second signal from the controller includes transmitting the second signal to a plurality of shield curtains in electronic communication with the controller to deploy the plurality of shield curtains from a first configuration to a second configuration.

\* \* \* \* \*

UNITED STATES PATENT AND TRADEMARK OFFICE
CERTIFICATE OF CORRECTION

PATENT NO. : 11,315,396 B2  
APPLICATION NO. : 16/957362  
DATED : April 26, 2022  
INVENTOR(S) : Robert Kaindl Page 1 of 1

It is certified that error appears in the above-identified patent and that said Letters Patent is hereby corrected as shown below:

In the Claims

Column 38, Claim 9, Lines 21-22:
"plurality of sensors provides a first second signal" should read --plurality of sensors provides a second signal--.

Signed and Sealed this  
Ninth Day of January, 2024

Katherine Kelly Vidal  
*Director of the United States Patent and Trademark Office*